United States Patent
Muto et al.

(10) Patent No.: US 8,707,176 B2
(45) Date of Patent: Apr. 22, 2014

(54) DISPLAY CONTROL APPARATUS AND DISPLAY CONTROL METHOD

(75) Inventors: Yohei Muto, Kawasaki (JP); Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 985 days.

(21) Appl. No.: 12/099,914

(22) Filed: Apr. 9, 2008

(65) Prior Publication Data
US 2008/0270901 A1 Oct. 30, 2008

(30) Foreign Application Priority Data

Apr. 25, 2007 (JP) ................................. 2007-115990
May 9, 2007 (JP) ................................. 2007-125026

(51) Int. Cl.
*G06F 3/00* (2006.01)
*G06F 17/00* (2006.01)
*G06F 3/048* (2013.01)
*G06F 15/16* (2006.01)

(52) U.S. Cl.
USPC ........... 715/704; 709/204; 715/863; 715/753; 715/756; 715/758

(58) Field of Classification Search
USPC ........................ 715/704, 753, 763; 345/619
See application file for complete search history.

(56) References Cited

U.S. PATENT DOCUMENTS

| | | | | |
|---|---|---|---|---|
| 5,572,728 A * | 11/1996 | Tada et al. | ...................... | 345/501 |
| 5,790,114 A * | 8/1998 | Geaghan et al. | ............... | 715/763 |
| 6,119,147 A * | 9/2000 | Toomey et al. | ................ | 709/204 |
| 6,188,931 B1 * | 2/2001 | Holmstrom et al. | .......... | 607/123 |
| 6,388,654 B1 * | 5/2002 | Platzker et al. | ................ | 345/156 |
| 6,459,442 B1 * | 10/2002 | Edwards et al. | ............... | 715/863 |
| 7,010,751 B2 * | 3/2006 | Shneiderman | ................. | 715/232 |
| 7,376,896 B2 * | 5/2008 | Ullmann et al. | ............... | 715/704 |
| 7,653,705 B2 * | 1/2010 | Gudipaty et al. | ............. | 709/218 |
| 7,725,493 B2 * | 5/2010 | Saund | ............................ | 707/797 |
| 8,370,745 B2 * | 2/2013 | Gould | ............................ | 715/720 |

(Continued)

FOREIGN PATENT DOCUMENTS

JP 05-067150 A 3/1993
JP 6-205151 7/1994

(Continued)

OTHER PUBLICATIONS

Japanese Office Action dated Feb. 12, 2013, in related Japanese Application No. 2007-115990.

(Continued)

*Primary Examiner* — Jordany Nunez
(74) *Attorney, Agent, or Firm* — Fitzpatrick, Cella, Harper & Scinto

(57) ABSTRACT

A display control method and a display control apparatus connected to a display apparatus acquires, from a recording apparatus which records drawn contents in a drawing area upon receiving operation information representing an operation in the drawing area, pieces of the operation information and the drawn contents, and determines, of the acquired pieces of the operation information, operation information which is not to be used for playback of drawn contents and decides a playback timing of drawn contents based on the order or the timing in which the operation information is received. Operation information other than the operation information determined not to be used for playback is extracted, and the drawn contents on the display apparatus are played back at the decided playback timing using the extracted operation information.

4 Claims, 27 Drawing Sheets

(56) References Cited

U.S. PATENT DOCUMENTS

| | | |
|---|---|---|
| 2004/0125877 A1* | 7/2004 | Chang et al. ............. 375/240.28 |
| 2007/0120871 A1* | 5/2007 | Okamoto et al. ............. 345/619 |
| 2011/0083087 A1* | 4/2011 | Sanders et al. ................ 715/756 |

FOREIGN PATENT DOCUMENTS

| | | |
|---|---|---|
| JP | 09-097220 A | 4/1997 |
| JP | 11-112922 | 4/1999 |
| JP | 2000-165577 A | 6/2000 |
| JP | 2004-151898 A | 5/2004 |
| JP | 2004-336289 | 11/2004 |
| JP | 2005-141284 | 6/2005 |
| JP | 2007-066018 A | 3/2007 |

OTHER PUBLICATIONS

Japanese Office Action dated Jun. 11, 2012, in related Japanese Patent Application No. 2007-125026.

* cited by examiner

FIG. 4

| OPERATION START TIME | | OPERATION END TIME | | OPERATION TYPE | OBJECT ID | PAGE NUMBER | USER ID |
|---|---|---|---|---|---|---|---|
| 2006/06/15 | 12:00:00 000 | 2006/06/15 | 12:00:00 500 | GENERATE | 0001 | 1 | User 1 |
| 2006/06/15 | 12:00:02 000 | 2006/06/15 | 12:00:02 500 | GENERATE | 0002 | 1 | User 1 |
| 2006/06/15 | 12:00:03 000 | 2006/06/15 | 12:00:03 500 | GENERATE | 0003 | 1 | User 1 |
| 2006/06/15 | 12:00:04 000 | 2006/06/15 | 12:00:04 500 | GENERATE | 0004 | 1 | User 1 |
| 2006/06/15 | 12:00:05 000 | 2006/06/15 | 12:00:05 500 | GENERATE | 0005 | 1 | User 1 |
| 2006/06/15 | 12:00:06 000 | 2006/06/15 | 12:00:06 500 | GENERATE | 0006 | 1 | User 1 |
| 2006/06/15 | 12:00:08 000 | 2006/06/15 | 12:00:08 500 | ERASE | 0006 | 1 | User 1 |
| 2006/06/15 | 12:00:10 000 | 2006/06/15 | 12:00:10 500 | GENERATE | 0007 | 1 | User 1 |
| 2006/06/15 | 12:00:20 000 | 2006/06/15 | 12:00:21 000 | PAGE SWITCH | — | 2 | User 1 |
| 2006/06/15 | 12:00:22 000 | 2006/06/15 | 12:00:22 500 | GENERATE | 0008 | 2 | User 1 |
| 2006/06/15 | 12:00:23 000 | 2006/06/15 | 12:00:23 500 | GENERATE | 0009 | 2 | User 1 |
| 2006/06/15 | 12:01:00 000 | 2006/06/15 | 12:01:00 500 | GENERATE | 0010 | 2 | User 1 |
| 2006/06/15 | 12:01:05 000 | 2006/06/15 | 12:01:10 000 | MOVE POINT [ ] | 0010 | 2 | User 1 |
| 2006/06/15 | 12:01:25 000 | 2006/06/15 | 12:01:25 500 | PAGE SWITCH | — | 3 | User 1 |
| 2006/06/15 | 12:01:26 000 | 2006/06/15 | 12:01:26 500 | PAGE SWITCH | — | 4 | User 1 |
| 2006/06/15 | 12:01:27 000 | 2006/06/15 | 12:01:27 500 | PAGE SWITCH | — | 3 | User 1 |
| 2006/06/15 | 12:01:28 000 | 2006/06/15 | 12:01:28 500 | PAGE SWITCH | — | 2 | User 1 |
| 2006/06/15 | 12:01:28 500 | 2006/06/15 | 12:01:28 500 | PAGE SWITCH | — | 1 | User 1 |
| 2006/06/15 | 12:01:30 000 | 2006/06/15 | 12:01:31 000 | RESIZE [···] | 0007 | 1 | User 1 |
| ·· | | ·· | | ·· | ·· | ·· | ·· |

FIG. 5

| DRAWN OBJECT ID | DATA TYPE | DRAWN DATA | GROUP ID |
|---|---|---|---|
| 0001 | STROKE | Point [ ] | 1 |
| 0002 | STROKE | Point [ ] | 1 |
| 0003 | STROKE | Point [ ] | 1 |
| 0004 | STROKE | Point [ ] | 1 |
| 0005 | STROKE | Point [ ] | 1 |
| 0006 | LINE | Line (90, 150, 310, 70) | – |
| 0007 | LINE | Line (90, 150, 310, 140) | – |
| 0008 | STROKE | Point [ ] | – |
| 0009 | RECTANGLE | Rect [20, 20, 500, 150] | – |
| 0010 | STROKE | Point [ ] | – |
| ⋮ | ⋮ | ⋮ | ⋮ |

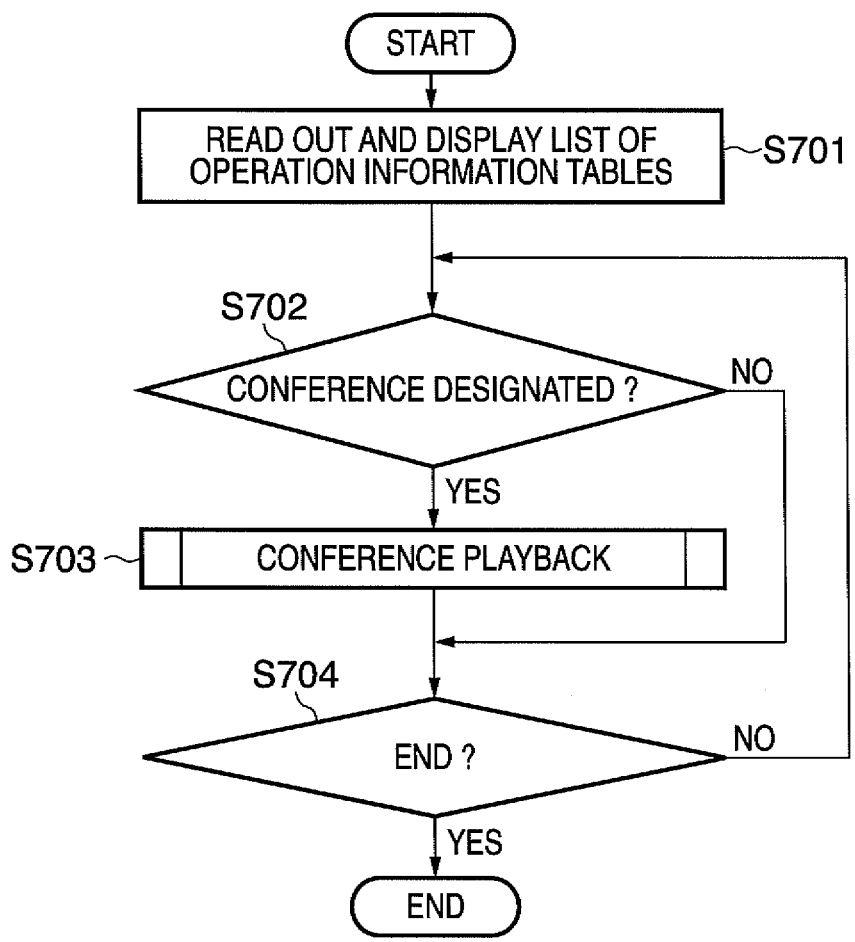
F I G. 7

F I G. 11
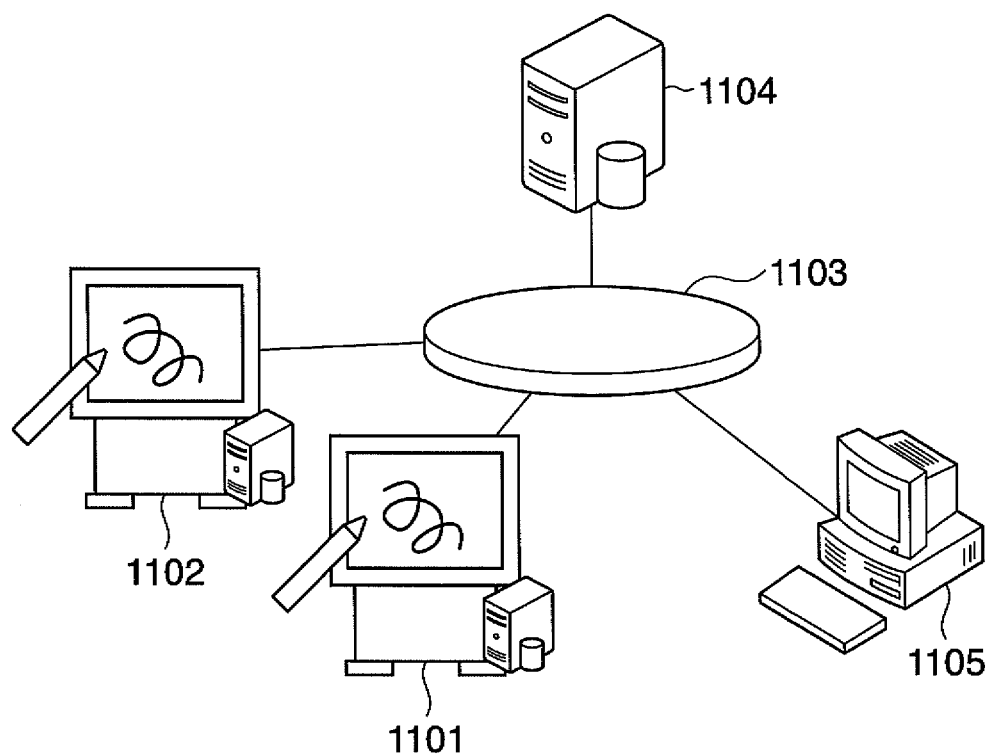

FIG. 15

| OPERATION START TIME | | OPERATION END TIME | | OPERATION TYPE | OBJECT ID | PAGE NUMBER | USER ID |
|---|---|---|---|---|---|---|---|
| 2006/06/15 | 12:00:00 000 | 2006/06/15 | 12:00:00 500 | GENERATE | 0001 | 1 | User 1 |
| 2006/06/15 | 12:00:02 000 | 2006/06/15 | 12:00:02 500 | GENERATE | 0002 | 1 | User 1 |
| 2006/06/15 | 12:00:03 000 | 2006/06/15 | 12:00:03 500 | GENERATE | 0003 | 1 | User 1 |
| 2006/06/15 | 12:00:04 000 | 2006/06/15 | 12:00:04:500 | GENERATE | 0004 | 1 | User 1 |
| 2006/06/15 | 12:00:05 000 | 2006/06/15 | 12:00:05:500 | GENERATE | 0005 | 1 | User 1 |
| 2006/06/15 | 12:00:06 000 | 2006/06/15 | 12:00:06:500 | ERASE | 0006 | 1 | User 1 |
| 2006/06/15 | 12:00:08 000 | 2006/06/15 | 12:00:08:500 | GENERATE | 0006 | 1 | User 1 |
| 2006/06/15 | 12:00:10 000 | 2006/06/15 | 12:00:10:500 | GENERATE | 0007 | 1 | User 1 |
| 2006/06/15 | 12:00:20 000 | 2006/06/15 | 12:00:21:000 | PAGE SWITCH | – | 2 | User 1 |
| 2006/06/15 | 12:00:22 000 | 2006/06/15 | 12:00:22:500 | GENERATE | 0008 | 2 | User 1 |
| 2006/06/15 | 12:00:23 000 | 2006/06/15 | 12:00:23:500 | GENERATE | 0009 | 2 | User 1 |
| 2006/06/15 | 12:01:00 000 | 2006/06/15 | 12:01:00:500 | GENERATE | 0010 | 2 | User 1 |
| 2006/06/15 | 12:01:05 000 | 2006/06/15 | 12:01:10:000 | MOVE POINT [ ] | 0010 | 2 | User 1 |
| 2006/06/15 | 12:01:25 000 | 2006/06/15 | 12:01:25:500 | PAGE SWITCH | – | 3 | User 1 |
| 2006/06/15 | 12:01:26 000 | 2006/06/15 | 12:01:26:500 | PAGE SWITCH | – | 4 | User 1 |
| 2006/06/15 | 12:01:27 000 | 2006/06/15 | 12:01:27:500 | PAGE SWITCH | – | 3 | User 1 |
| 2006/06/15 | 12:01:28 000 | 2006/06/15 | 12:01:28:500 | PAGE SWITCH | – | 2 | User 1 |
| 2006/06/15 | 12:01:28 000 | 2006/06/15 | 12:01:28:500 | PAGE SWITCH | – | 1 | User 1 |
| 2006/06/15 | 12:01:30 000 | 2006/06/15 | 12:01:31:000 | RESIZE [...] | 0007 | 1 | User 1 |
| .. | | .. | | .. | .. | .. | .. |

F I G. 16

| DRAWN OBJECT ID | DATA TYPE | DRAWN OBJECT DATA |
|---|---|---|
| 0001 | STROKE | Point [ ] |
| 0002 | STROKE | Point [ ] |
| 0003 | STROKE | Point [ ] |
| 0004 | STROKE | Point [ ] |
| 0005 | STROKE | Point [ ] |
| 0006 | LINE | Line (90, 150, 310, 70) |
| 0007 | LINE | Line (90, 150, 310, 140) |
| 0008 | STROKE | Point [ ] |
| 0009 | RECTANGLE | Rect [20, 20, 500, 150] |
| 0010 | STROKE | Point [ ] |
| ⋮ | ⋮ | ⋮ |

FIG. 19

- DESIGNATE TIME LENGTH

DESIGNATE TIME OF INFORMATION
TO BE EXTRACTED IN SECONDS
BEFORE AND AFTER
EXTRACTED INFORMATION

☐☐ SEC

■ DESIGNATE NUMBER OF OPERATIONS

DESIGNATE NUMBER OF OPERATIONS
TO BE EXTRACTED
BEFORE AND AFTER
EXTRACTED INFORMATION

□□ SEC

OK

F I G. 27
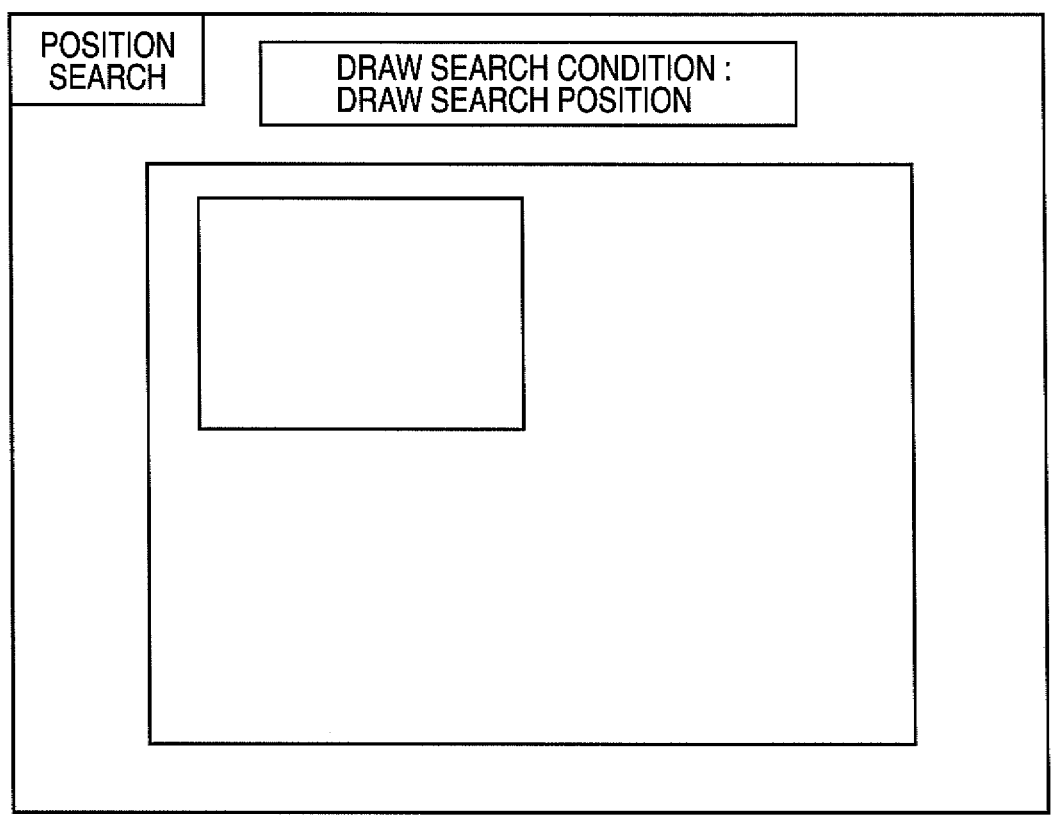

DISPLAY CONTROL APPARATUS AND DISPLAY CONTROL METHOD

BACKGROUND OF THE INVENTION

1. Field of the Invention

The present invention relates to a display control apparatus and a display control method, which play back contents drawn in a drawing area for drawing an object.

2. Description of the Related Art

Recently, large screen display apparatuses represented by a plasma display and also including a rear-projection display and a front projector have been widespread. Presentations, conferences, and school lessons using such a large screen display apparatus are becoming popular.

In a conference or school lesson using a large screen display apparatus, a user conventionally uses a pointing rod or a laser pointer as a means for indicating a specific position on the display screen.

However, a pointing system having a digitizer for detecting a position (indicated position) on the display screen indicated by a user is developed recently and used often. This pointing system can move a cursor on the display screen in correspondence with a position indicated by a user, or generate a drawn object such as a character or graphic pattern on the display screen by activating a tool corresponding to an indicated position. The system can also freely edit the generated drawn object.

Such a pointing system generally connects a large screen display apparatus to the video output terminal of a display control apparatus such as a personal computer, thereby displaying display data generated by the personal computer on the large screen display apparatus. The system also connects the digitizer to the personal computer using an interface cable and transmits information about an indicated position via the interface cable.

Additionally, an application for reflecting information about an indicated position input via the interface cable on cursor movement or generation of a drawn object such as a character or graphic pattern is installed on the personal computer side.

The pointing system having the above-described arrangement can implement various functions by expanding the functions of the installed application.

For example, direct drawing corresponding to an indicated position on the display screen implements a handwriting input function. This makes the large screen display apparatus usable as an electronic whiteboard.

When drawn contents displayed on the display screen change in accordance with a user operation, the contents of the change are recorded together with time data and played back along the time data. This system arrangement implements a playback function. This playback function allows playing back drawn contents displayed on the display screen during a conference along with the elapse of the time of conference. Hence, if, for example, the large screen display apparatus is used as an electronic whiteboard, the playback contents can be used as a conference report.

Various proposals have been made for the playback function of playing back change contents recorded together with time data.

For example, Japanese Patent Laid-Open No. 2004-336289 discloses a snapshot of a whiteboard as a target to be recorded for the purpose of playback by the playback function. This enables playback of a conference or school lesson. Japanese Patent Laid-Open No. 6-205151 discloses an arrangement for playing back voice/image information during a conference, too.

A proposal for improving user convenience in playback using the playback function has also been made. For example, to shorten the playback time, not only the normal-rate playback mode but also functions such as a fast-forward mode and a double-rate playback mode have been proposed.

Japanese Patent Laid-Open No. 11-112922 discloses an arrangement for analyzing an event point such as an image change point or voice speaker change point from input image or voice stream data. According to this prior art, when an event point is detected during playback, the stream near the event point is played back slowly, thereby allowing a user to easily recognize a specific stream.

However, there are several problems in applying the playback function aiming at improving user convenience to the pointing system. For example, the playback function plays back even a drawn object that a user temporarily input by handwriting and immediately erased, that is, a drawn object that is not directly relevant to grasp of, for example, conference contents. If a user inputs the strokes of characters one by one by handwriting, the strokes of each drawn object input by handwriting are sequentially played back one by one, resulting in long playback time.

The playback time is short in playback using the fast-forward mode or double-rate playback mode. However, a portion necessary for grasping the playback contents is also played back at a high speed. This impedes the user from grasping the playback contents.

There is also an arrangement for analyzing each recorded drawn object and detecting an event point, thereby slowly playing back data near the event point, as in Japanese Patent Laid-Open No. 11-112922. However, this method requires analysis of a recorded drawn object, resulting in complex processing.

SUMMARY OF THE INVENTION

The present invention has been made in consideration of the above-described problems, and has as its object to cause a display control apparatus capable of sequentially playing back drawn contents to implement, by a simple method, playback that facilitates grasp of playback contents while shortening the playback time.

According to an aspect of the present invention, there is provided a display control apparatus connected to a display apparatus, comprising:

an acquisition unit configured to acquire, from a recording apparatus which records contents of a change in a drawing area for drawing an object upon acquiring operation information representing an operation in the drawing area, pieces of information about the contents of the change;

a determination unit configured to determine, of the pieces of information acquired by the acquisition unit, information to be used for playback of drawn contents and determine a playback timing of the drawn contents based on the information; and a playback unit configured to extract the information determined to be used for playback by the determination unit and playback the drawn contents on the display apparatus at the decided playback timing using the extracted information.

According to another aspect of the present invention, there is provided a display control apparatus connected to a display apparatus, comprising:

an acquisition unit configured to acquire, from a recording apparatus which records contents of a change in a drawing area for drawing an object upon acquiring operation information representing an operation in the drawing area, pieces of information about the contents of the change;

an input unit configured to input a first condition to extract, from the pieces of information acquired by the acquisition unit, information to be used for playback of drawn contents; and a playback unit configured to extract information which satisfies the first condition from the pieces of information acquired by the acquisition unit and continuously playing back the drawn contents on the display apparatus using the extracted information.

According to still another aspect of the present invention, there is provided a display control method in a display control apparatus connected to a display apparatus, comprising the steps of:

acquiring, from a recording apparatus which records contents of a change in a drawing area for drawing an object upon acquiring operation information representing an operation in the drawing area, pieces of information about the contents of the change;

determining, of the pieces of information acquired in the acquiring step, information to be used for playback of drawn contents and deciding a playback timing of the drawn contents based on the information; and extracting the information determined to be used for playback in the determining step and playing back the drawn contents on the display apparatus at the decided playback timing using the extracted information.

According to still another aspect of the present invention, there is provided a display control method in a display control apparatus connected to a display apparatus, comprising the steps of:

acquiring, from a recording apparatus which records contents of a change in a drawing area for drawing an object upon acquiring operation information representing an operation in the drawing area, pieces of information about the contents of the change;

inputting a first condition to extract, from the pieces of information acquired in the acquiring step, information to be used for playback of drawn contents; and extracting information which satisfies the first condition from the pieces of information acquired in the acquiring step and continuously playing back the drawn contents on the display apparatus using the extracted information.

According to the present invention, it is possible to cause a display control apparatus capable of sequentially playing back display contents to implement, by a simple method, playback that facilitates grasp of contents while shortening the playback time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of an operation information table 251 which records operation information when drawn contents drawn in a drawing area 301 have changed in accordance with a user operation during execution of the drawing mode of the electronic whiteboard application 240;

FIG. 5 is a view showing an example of a drawn object table 252 which records information about a drawn object generated or edited during execution of the playback mode of the electronic whiteboard application 240 in the conference system 100;

FIG. 7 is a flowchart illustrating a conference playback process procedure in the playback mode of the electronic whiteboard application 240 of the conference system 100;

FIG. 11 is a view showing the overall arrangement of a conference system using a display control apparatus according to the second embodiment of the present invention;

FIG. 15 is a view showing an example of an operation information table 1321 which records operation information about a user operation performed during execution of the drawing mode of the electronic whiteboard application 1310;

FIG. 16 is a view showing an example of a drawn object information table 1322 which records drawn object information about a drawn object that has changed due to a generation or editing operation during execution of the playback mode of the electronic whiteboard application 1310 in the conference system 1200;

FIG. 19 is a view showing an example of a UI for setting a condition to extract pieces of operation information recorded within a predetermined time before and after extracted operation information;

FIG. 20 is a view showing an example of a UI for setting a condition to extract pieces of operation information corresponding to a predetermined number of operations before and after extracted operation information;

FIG. 27 is a view showing an example of a screen for inputting a search condition corresponding to a selected search type.

DESCRIPTION OF THE EMBODIMENTS

Preferred embodiments of the present invention will now be described in detail in accordance with the accompanying drawings.

First Embodiment

1. Outer Appearance of Conference System

Figure 1:
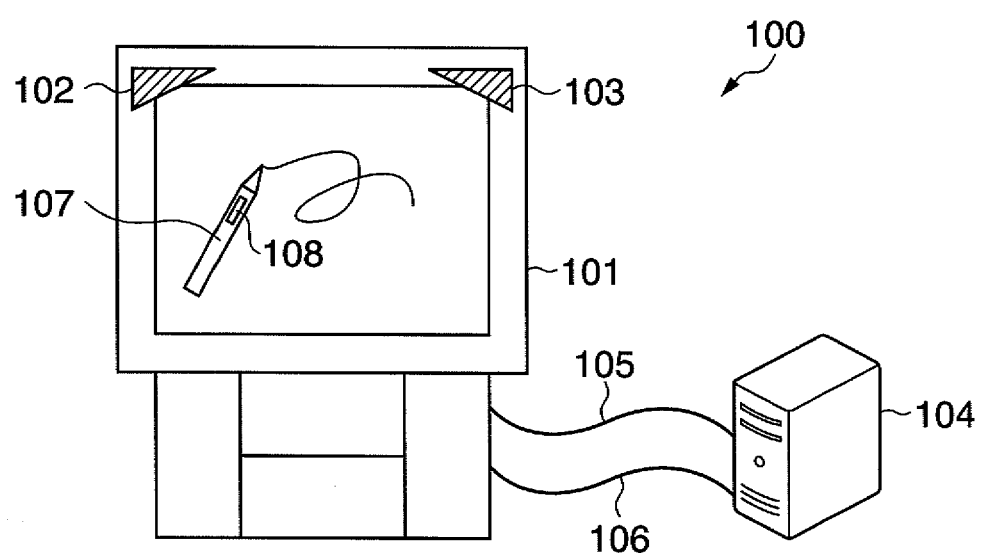
FIG. 1 is a view showing the outer appearance of a conference system 100 having a display control apparatus according to the first embodiment of the present invention.

FIG. 1 is a view showing the outer appearance of a conference system (display control system) 100 having a display control apparatus according to the first embodiment of the present invention.

A rear-projection display 101 has a function of a display unit which displays, on the display screen, an execution result of an application (control program) stored in a personal computer (to be described later) to implement an electronic whiteboard.

The rear-projection display 101 incorporates an optical system including a light source lamp, color filter, liquid crystal panel, optical lens, and mirror. Light emitted from the light source lamp is separated into three color light components of RGB by the color filter and the like. The light components irradiate the liquid crystal panel. The optical system enlarges and projects the light modulated by the liquid crystal panel onto the display screen of the rear-projection display 101 so that an execution result of the electronic whiteboard application is displayed on the display screen.

Digitizer modules 102 and 103 are arranged on the upper left and right corners of the display screen. The digitizer modules 102 and 103 emit infrared light and scan the surface of the display screen. An obstacle on the display screen cuts off the emitted infrared light and changes the level of the reception signal. This allows detection of the position and size of the obstacle. That is, the rear-projection display 101 having the digitizer modules 102 and 103 arranged as described above has a function of an input unit which receives a user instruction on the display screen.

As a result, when a user indicates a predetermined position on the display screen using, for example, a finger or pointing rod, the rear-projection display 101 can detect the position and size.

A digitizer pen 107 indicates a position on the display screen. The digitizer pen 107 functions as a pointing device for inputting an indication on the display screen. The digitizer pen 107 has a click determination switch at the tip and an eraser switch 108 on the side surface. When the user presses the eraser switch 108, an eraser mode is temporarily set. If the user indicates a position on the display screen in this state, a drawn object corresponding to the indicated position is erased.

A personal computer 104 functions as a display control apparatus which controls display of a drawn object to be displayed on the rear-projection display 101 based on, for example, an indication input by the digitizer pen 107. The personal computer 104 is connected to the rear-projection display 101 via an image signal cable 105 and a communication cable 106. The personal computer 104 is also connected to a keyboard (not shown) that functions as an input device for the personal computer 104. The operations of various kinds of applications in the personal computer 104 are controlled based on an input from the keyboard.

2. Arrangement of Units of Conference System 100

Figure 2:
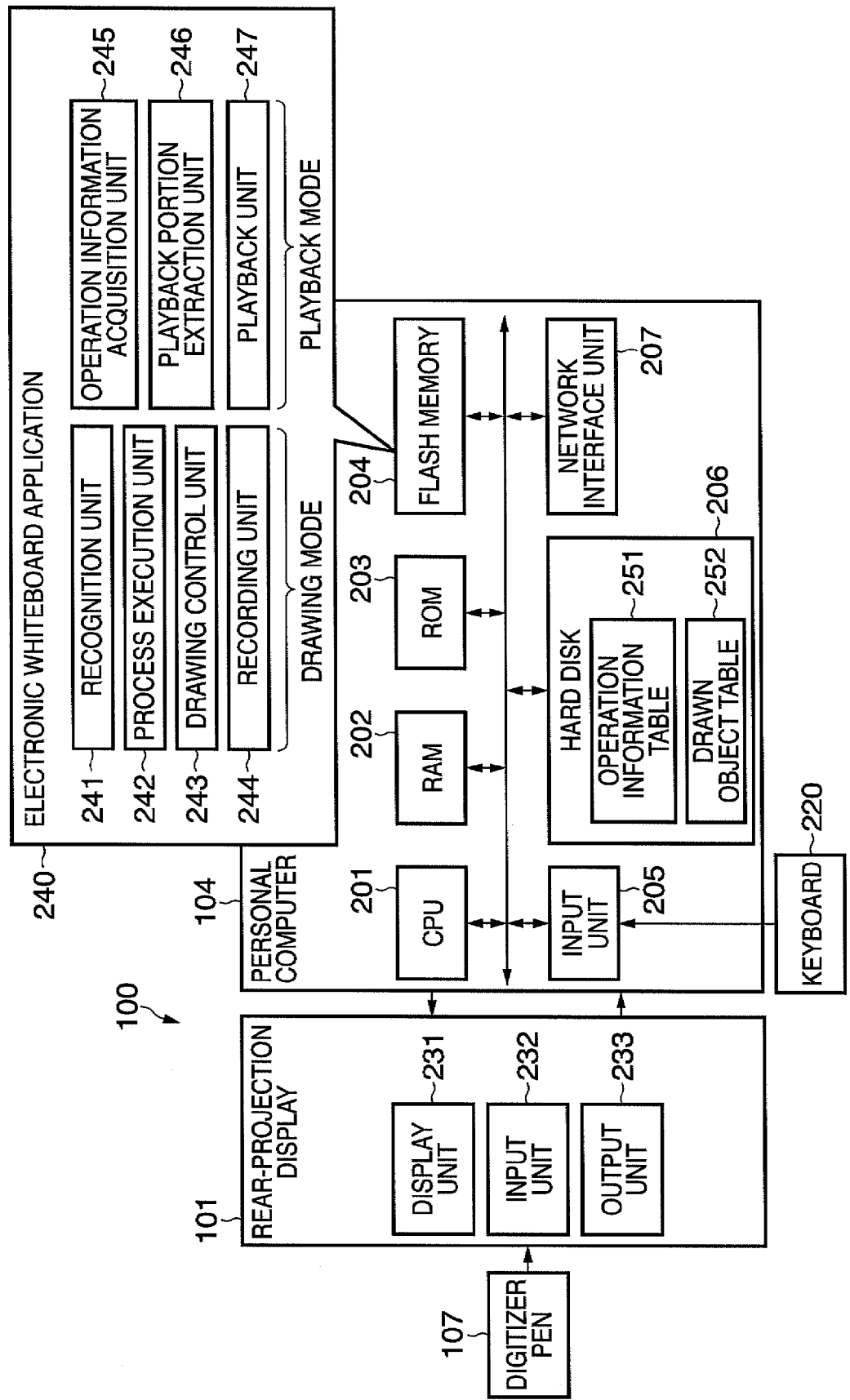
FIG. 2 is a block diagram showing the arrangement of units included in the conference system 100.

FIG. 2 is a block diagram showing the arrangement of units included in the conference system 100. As described above, the conference system 100 includes the digitizer pen 107 functioning as a pointing device, and the rear-projection display 101 functioning as an electronic whiteboard. The conference system 100 also includes the personal computer 104 functioning as a display control apparatus, and a keyboard 220 functioning as an input device for the personal computer 104.

2.1 Digitizer Pen

The digitizer pen 107 functioning as a pointing device can indicate a predetermined position on the display screen when the digitizer modules 102 and 103 function as an input unit 232 for detecting an indicated position.

2.2 Rear-Projection Display

The rear-projection display 101 includes a display unit 231, the input unit 232, and an output unit 233.

The input unit 232 receives an indication from the digitizer pen 107. The output unit 233 outputs information about the received indicated position to the personal computer 104. When the personal computer 104 executes the drawing mode of the electronic whiteboard application and executes various kinds of processes corresponding to the information about the indicated position, the display unit 231 receives and displays the execution result.

Hence, the rear-projection display 101 can execute display by, for example, moving a cursor to a detected indicated position, generating or erasing a drawn object such as a character or graphic pattern, or generating or erasing a drawn object input by handwriting. Consequently, the rear-projection display 101 functions as an electronic whiteboard.

The display unit 231 of the rear-projection display 101 also receives and displays playback contents output upon executing the playback mode of the electronic whiteboard application in the personal computer 104. That is, the rear-projection display 101 also functions as a playback device for displaying playback contents.

2.3 Personal Computer

The personal computer 104 functioning as a display control apparatus includes a CPU 201, RAM 202, ROM 203, flash memory 204, input unit 205, hard disk 206, and network interface unit 207.

The input unit 205 receives information about an indicated position output from the output unit 233 of the rear-projection display 101. The input unit 205 also receives an instruction from the keyboard 220 functioning as an input device for the personal computer 104.

An electronic whiteboard application 240 stored in the flash memory 204 has functions to be executed in the drawing mode and those to be executed in the playback mode. The drawing mode causes the rear-projection display 101 to function as an electronic whiteboard. The playback mode causes the rear-projection display 101 to function as a playback device.

As the functions to be executed in the drawing mode, the electronic whiteboard application 240 includes a recognition unit 241, process execution unit 242, drawing control unit 243, and recording unit 244.

The recognition unit 241 recognizes various operation instructions received by the input unit 205. More specifically, the recognition unit 241 recognizes a page operation instruction for moving a page defined in a drawing area, a drawn object generation instruction, or an instruction for editing an already generated drawn object.

The process execution unit 242 executes processes corresponding to various instructions recognized by the recognition unit 241.

If a drawn object to be displayed on the display unit 231 is changed by a process executed by the process execution unit 242, the drawing control unit 243 generates the changed object and outputs it to the display unit 231.

If a drawn object to be displayed on the display unit 231 has changed in accordance with various operation instructions recognized by the recognition unit 241, the recording unit 244 sequentially records the operation information in an operation information table 251 in the hard disk 206. The recording unit 244 also sequentially records information about the changed drawn object in a drawn object table 252.

As the functions to be executed in the playback mode, the electronic whiteboard application 240 includes an operation information acquisition unit 245, playback portion extraction unit 246, and playback unit 247.

The operation information acquisition unit 245 acquires an operation information table and drawn object table designated by the user from the plurality of operation information tables 251 and drawn object tables 252 which are recorded in the hard disk 206 in the respective conferences.

The playback portion extraction unit 246 discriminates between operation information to be used to play back drawn contents and operation information unnecessary for playback based on the acquired operation information table 251 and drawn object table 252 and determines the playback timing of the drawn contents.

Conditions to discriminate between operation information to be used for playback and operation information unnecessary for playback are as follows.

Whether generated or edited drawn objects are put into a group.

Whether generated or edited drawn objects are temporary drawn objects.

Whether a page operation is a continuous page operation.

Whether a drawn object editing operation is a predetermined editing operation.

Note that a character process (determining whether a drawn object is a character and a character recognition process) is executed for a drawn object generated by handwriting, and the playback portion extraction unit 246 executes the character process.

The playback unit 247 extracts the operation information determined to be used for playback and plays back the drawn contents at the determined playback timing using the operation information.

The electronic whiteboard application 240, operation information table 251, and drawn object table 252 are loaded in the RAM 202 as needed under the control of the CPU 201 and executed by the CPU 201.

The network interface unit 207 communicates with an external device.

3. Arrangement of Display Window

Figure 3:
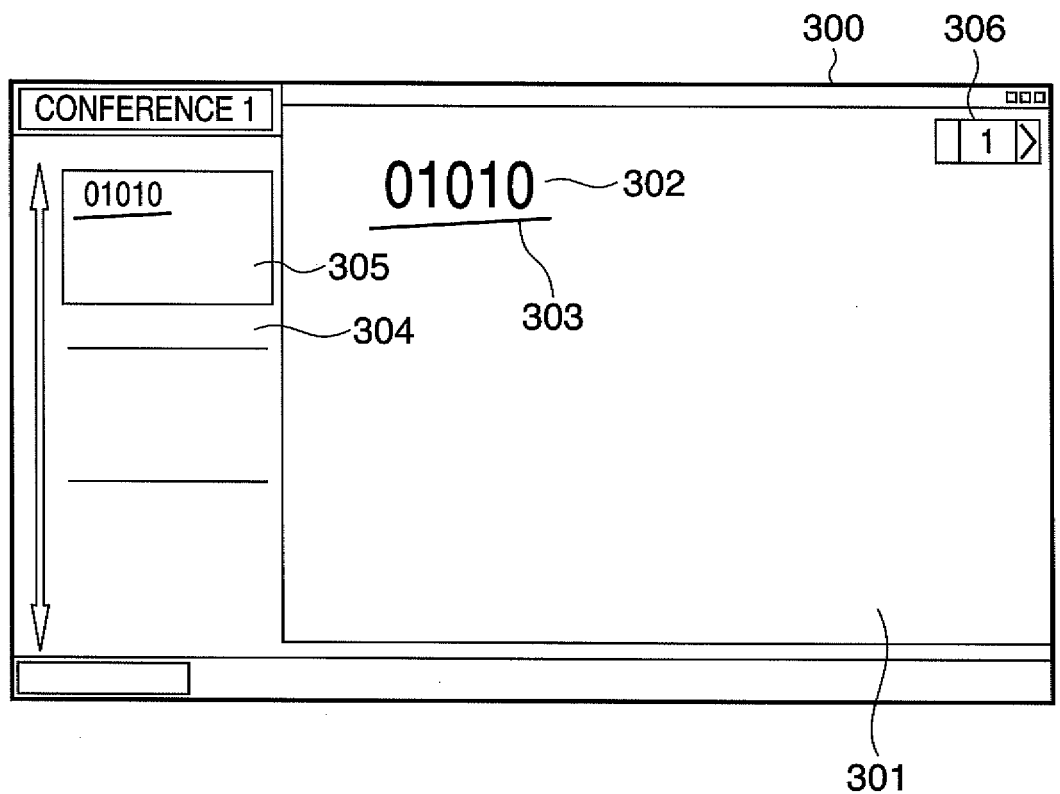
FIG. 3 is a view showing an example of a UI which is displayed on a rear-projection display 101 by activating the drawing mode of an electronic whiteboard application in the conference system 100.

FIG. 3 is a view showing an example of a UI which is displayed on the rear-projection display 101 by activating the drawing mode of the electronic whiteboard application in the conference system 100.

Referring to FIG. 3, reference numeral 300 denotes a display window. An area (drawing area) 301 allows drawing input in the display window 300. In the drawing mode, the user can generate a drawn object by pointing input using the digitizer pen 107. Reference numerals 302 and 303 denote examples of generated drawn objects.

The drawn object 302 is a character string "01010" which includes five strokes input by handwriting in a handwriting input mode. The drawn object 303 is a line that is input in a tool input mode and includes one stroke. Switching between the handwriting input mode and the tool input mode is done by a menu (not shown).

The menu can be either located in the display window 300, or displayed as a context menu when the user presses a switch provided on the digitizer pen 107. The digitizer pen 107 may separately have a switch dedicated to input mode switching. The tool input mode may have not only a line drawing tool but also a graphic tool for a circle and rectangle.

The drawn objects 302 and 303 drawn in the drawing area 301 can undergo editing. More specifically, the user selects a drawn object and an item from a menu (not shown), thereby executing editing operations such as movement, resize, erase, cut, and copy.

A page operation area 304 enables a page operation for a page defined in the drawing area 301. A page operation area 304 displays a thumbnail 305 of a page. The user can perform page operations such as switching, movement, and deletion of a page, and addition of a new page using a page operation button 306.

Reference numeral 306 denotes the page operation button including the number of a page that is being displayed, and page skip and return buttons which are also usable for page switching.

4. Arrangement of Operation Information Table

FIG. 4 is a view showing an example of the operation information table 251 which records operation information when contents drawn in the drawing area 301 have changed in accordance with a user operation during execution of the drawing mode of the electronic whiteboard application 240.

The operation information table 251 is generated in each conference. When the contents drawn in the drawing area 301 have changed due to the drawn object generation operation, editing operation, and page operation, the recording unit 244 sequentially records, in the hard disk 206, the change contents as operation information, thereby generating the operation information table.

Each piece of operation information recorded in the operation information table 251 has items "operation start time", "operation end time", "operation type", "object ID", "page number", and "user ID".

"Operation start time" indicates the time when an operation has started. "Operation end time" indicates the time when an operation has finished. "Operation type" indicates the type of an operation.

"Object ID" indicates the identifier of a drawn object changed by a user operation and corresponds to the drawn object table shown in FIG. 5. "Page number" indicates the number of an operated page or switching destination page. "User ID" indicates the ID of an operator.

5. Arrangement of Drawn Object Table 252

FIG. 5 is a view showing an example of the drawn object table 252 which records information about a drawn object generated or edited during execution of the playback mode of the electronic whiteboard application 240 in the conference system 100.

A drawn object generated in the drawing area 301 is automatically assigned an ID. The drawn object table 252 records, as information about a drawn object, "drawn object ID", "data type", "group ID", and data ("drawn object data") necessary for generating a drawn object.

"Data type" indicates the type of a drawn object, including a stroke or a graphic tool type such as a line, rectangle, or circle. "Drawn object data" saves the X and Y coordinates of a handwritten stroke, the coordinates of the start and end points of a line, or the upper left coordinates and lower right coordinates of a rectangle. Color data, line type data, filling color, and the like may also be saved.

"Group ID" is assigned to a group including a plurality of drawn objects.

As a grouping method, drawn objects generated in the drawing area 301 at close times or strokes drawn at close positions are put into a group, or a combination of these methods is used. Grouping may be done in blocks of character strings by combining the above-described methods with a character recognition process by a character recognition program. This process will be described later. Alternatively, items "grouping" and "cancel grouping" can be added to the menu in the display window 300 such that the user manually executes the grouping operation. For example, the user may manually select a plurality of drawn objects and select "grouping" in the menu to put the drawn objects into a group.

In this embodiment, the operation information table (FIG. 4) and drawn object table (FIG. 5) are created in each conference and recorded in the hard disk 206 of the conference system 100 during or at the end of the conference. However, the recording destination is not limited to the hard disk 206. The tables may be recorded in a recording apparatus (not shown) such as a server on a network via the network interface unit 207.

6. Arrangement of Playback Window

Figure 6:
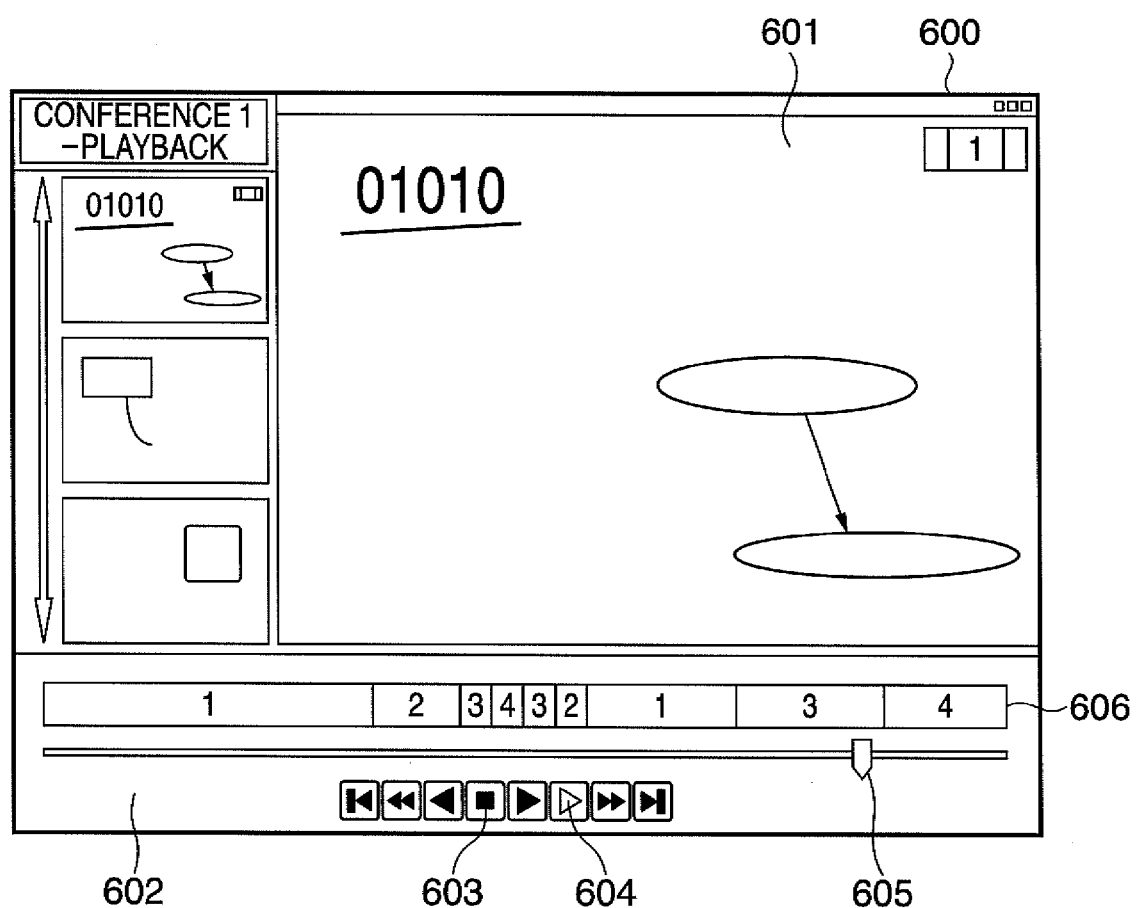
FIG. 6 is a view showing an example of a playback window 600 which plays back contents drawn in the drawing area 301 during a conference on the basis of the operation information table 251 and drawn object table 252 in the conference system 100.

FIG. 6 is a view showing an example of a playback window 600 which plays back drawn contents drawn in the drawing area 301 during a conference based on the operation information table 251 and drawn object table 252 in the conference system 100. FIG. 6 shows an example of a UI in the playback mode of the electronic whiteboard application 240.

As shown in FIG. 6, a playback result display area 601 is displayed on the upper side of the screen. A playback operation area 602 is displayed on the lower side of the screen.

Various kinds of operation buttons 603 control the playback method. The operation buttons 603 for controlling the playback method include not only a normal playback button and a stop button but also buttons for changing the playback speed such as a fast-forward button and a rewind button. The operation buttons 603 also include an extraction playback button 604 which extracts only a portion necessary for playback and plays it back to shorten the playback time.

A slider 605 indicates a playback point during playback. The user can change the playback point by dragging the slider 605. Reference numeral 606 indicates a page transition corresponding to the page numbers in the operation information table 251. In the example shown in FIG. 6, the pages are switched in the order of 1, 2, 3, 4, 3, 2, 1, 3, and 4 from the start of the conference, and page 3 is currently being played back.

7. Sequence of Overall Process in Conference System 100

FIG. 7 is a flowchart illustrating a conference playback process procedure in the playback mode of the electronic whiteboard application 240 of the conference system 100.

In step S701, initialization necessary for the operation of the electronic whiteboard application 240 is executed, and a list of operation information tables is read out and displayed.

In step S702, the user designates a conference to start playback. The conference designation method is not particularly limited. The user can either directly designate a conference from the operation information table list displayed in step S701 or designate a conference by a search based on a predetermined search condition.

In step S703, playback is performed based on operation information recorded in the operation information table designated in step S702. The sequence of the playback process based on operation information will be described later in detail with reference to FIG. 8.

In step S704, the end of the electronic whiteboard application 240 is determined. If the electronic whiteboard application 240 is not ended, the process returns to step S702 to execute playback again based on another operation information table.

8. Sequence of Playback Process

Figure 8:
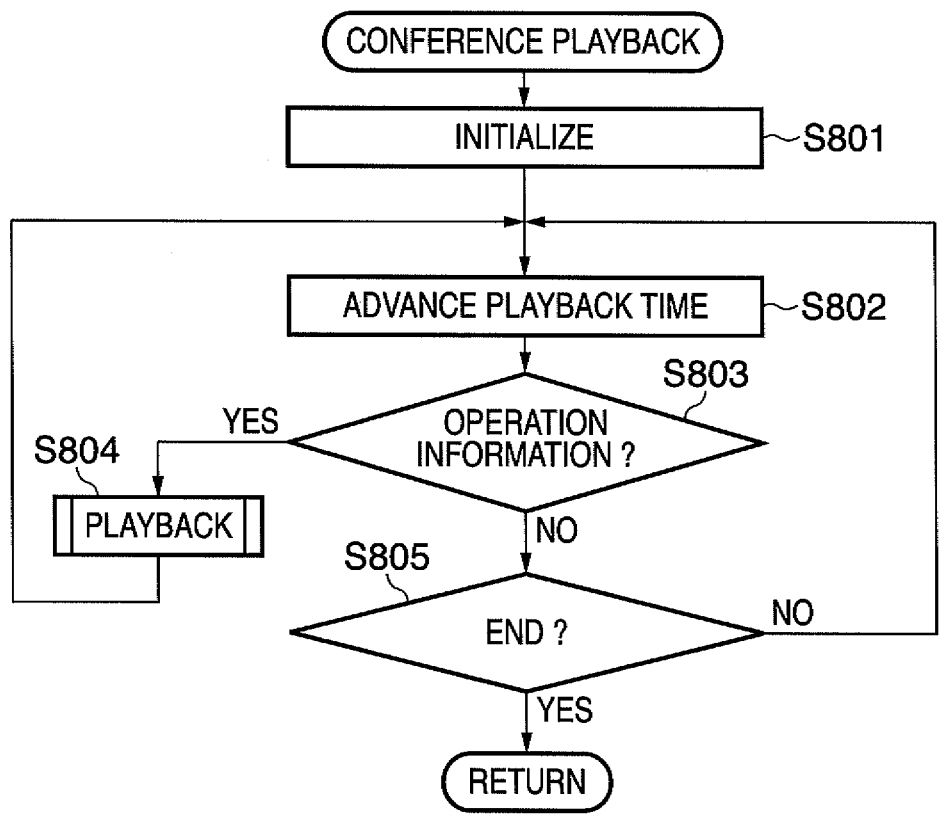
FIG. 8 is a flowchart illustrating a playback process procedure executed based on operation information in a designated operation information table.

FIG. 8 is a flowchart illustrating a playback process procedure executed based on operation information in a designated operation information table.

In step S801, the designed operation information table 251 and corresponding drawn object table 252 are read out, and a progress timer for playback time control is initialized.

In step S802, the playback time control timer is advanced. In step S803, the pieces of operation information are sequentially read out from the operation information table in the order of operation start times, and it is determined whether next operation information exists. If no next operation information exits, the process advances to step S805. In step S805, if the operation end time of the current operation information is the end time of the conference, it is determined that the conference is ended. The playback process is ended.

If it is determined that next operation information exits, the process advances to step S804. The playback process is step S804 will be described next with reference to the flowchart in FIG. 9.

9. Details of Playback Process

Figure 9:
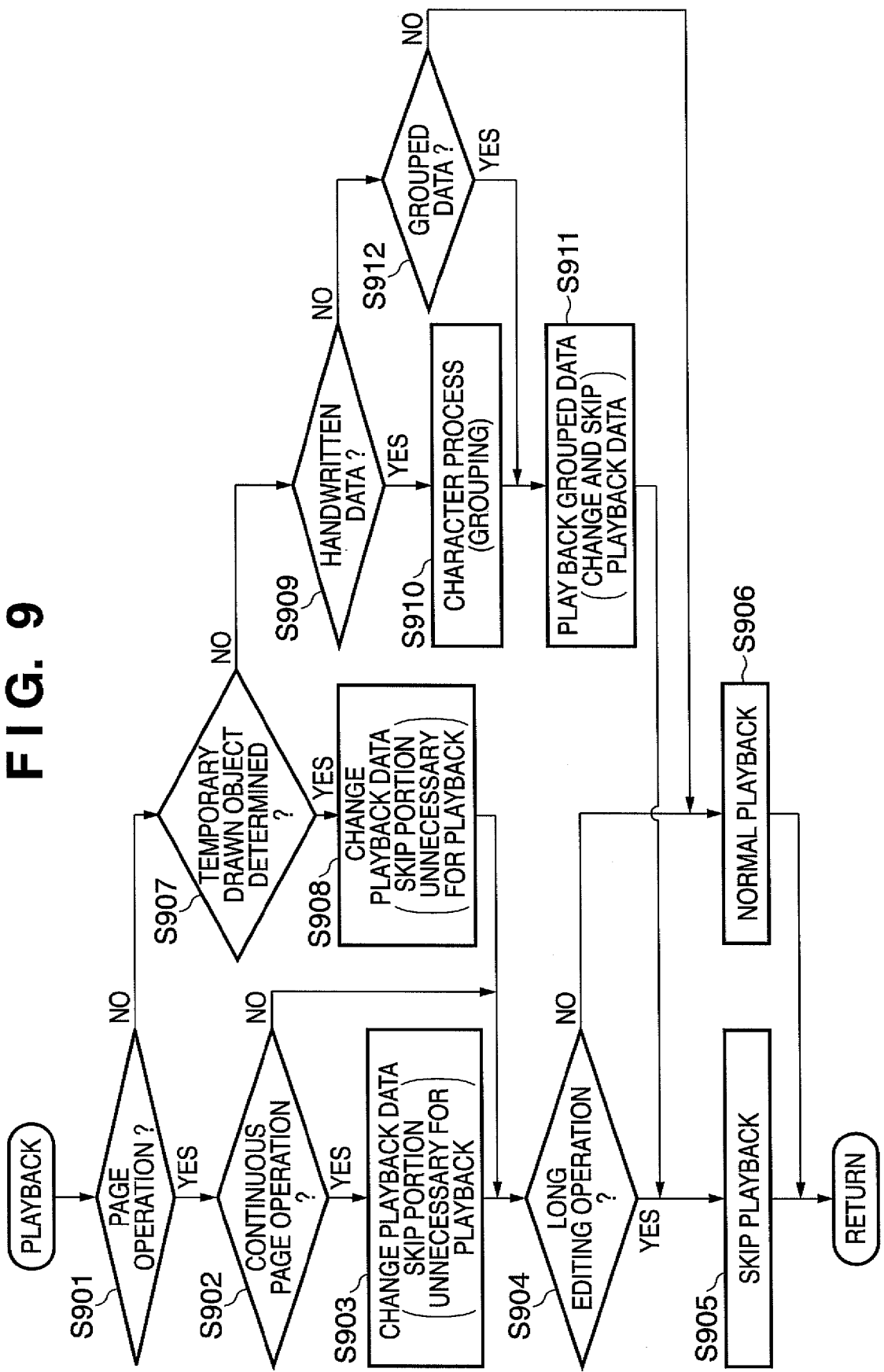
FIG. 9 is a flowchart illustrating details of the playback process (step S804) of the playback process procedure of the conference system 100.

FIG. 9 is a flowchart illustrating details of the playback process (step S804) of the playback process procedure of the conference system 100.

As shown in FIG. 9, in step S901, if the operation type of the readout operation information indicates a page operation, the process advances to step S902.

In step S902, it is determined whether the operation information is recorded in accordance with a continuous page operation. The operator performs the continuous page operation to search for a target page by continuously switching the pages. When the page display time of an intermediate part except the first and last pages is short, or when no other drawn objects are generated or edited between the page switching operations, the page operations are determined as a continuous page operation.

In the example of the operation information table shown in FIG. 4, the pages are switched in the order of 1→2→3→4→3→2→1. The page switching operations from page 2 to 3, from 3 to 4, from 4 to 3, and from 3 to 2 are determined as a continuous page operation because the display time is short, and no other operation is inserted between them.

If the page operation is determined as a continuous page operation in step S902, the process advances to step S903.

In step S903, operation information unnecessary for playback is skipped, and the operation information to be played back and the playback time control timer are changed to the final page switching operation. In playback, therefore, drawn contents corresponding to the operation information of page 2 are played back. Then, drawn contents corresponding to the operation information of page 1 are played back.

In step S904, it is determined whether a plurality of pieces of operation information are recorded in accordance with a long editing operation. A long editing operation is executed by, for example, moving a drawn object by drag & drop in a long time.

In this case, operation information that records the movement of the drawn object during drag is operation information unnecessary for playback. It is only necessary to play back drawn contents corresponding to operation information recorded when the drawn object was located at the start position.

For example, when the color of a drawn object is changed, operation information recorded upon selecting a color from a color selection dialog box and pressing an OK button is unnecessary for playback. In this case, operation information recorded between the operation start time and the operation end time of color change is determined as a playback Unnecessary portion. Skip playback is executed by playing back the drawn contents based only on the operation information recorded at the start and end of the editing operation.

As described above, an editing operation having a large difference between the operation start time and the operation end time is regarded as a long editing operation. The process advances to step S905 to execute skip playback.

If it is determined in step S904 that the editing operation is not a long editing operation, the process advances to step S906 to execute normal playback. In the above-described example of the continuous page switching operation, the process is changed in step S903 to play back the switching operation from page 2 to page 1. Hence, the switching operation to page 1 is normally played back.

If it is determined in step S901 that the operation type does not indicate a page operation, the process advances to step S907 to determine whether a drawn object is a temporary drawn object.

A temporary drawn object is a drawn object that was drawn and immediately erased by an erase operation. In this embodiment, even when the user inputs incorrect handwritten strokes using the digitizer pen 107, he/she can immediately erase the incorrect handwritten strokes by tracing them while pressing the eraser button of the digitizer pen 107.

Figure 10:
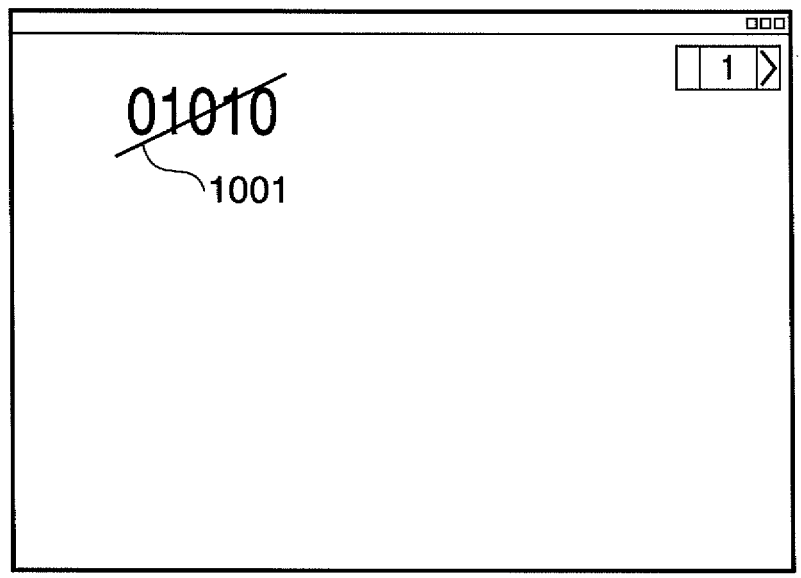
FIG. 10 is a view showing an example of a temporary drawn object display screen.

FIG. 10 is a view showing an example of a temporary drawn object display screen. FIG. 10 shows a state in which after drawing five handwritten strokes, the user erroneously inputs a next drawn object 1001 (object ID=0006) in the operation information table in FIG. 4.

Referring to FIG. 4, the drawn object 1001 (object ID=0006) is erased immediately after generation. After erase, a correct object (object ID=0007) is drawn. In this case, the drawn object 1001 is regarded as a temporary drawn object.

Other conditions for regarding a drawn object as a temporary drawn object are, for example, erase in a predetermined time after drawn object generation, erase in a predetermined number of operations after generation, erase without a predetermined operation after generation, and erase by a specific operation (erase by the eraser switch or a menu). As described above, a drawn object which was temporarily drawn in the drawing area 301 and immediately erased is determined as a temporary drawn object. Consequently, operation information recorded upon generating the drawn object (operation information related to the generation operation) and operation information recorded upon erasing the drawn object (operation information related to the erase operation) are determined to be unnecessary for playback.

If a drawn object is determined as a temporary drawn object in step S907, the process advances to step S908. In step S908, operation information determined to be unnecessary for playback is skipped, and the operation information and the playback time control timer are changed to the next operation information after erase.

The processes in steps S904, S905, and S906 are the same as described above, and a description thereof will not be repeated.

In the examples shown in FIGS. 4 and 10, a playback is done to generate the drawn object (object ID=0007) after generating the drawn object (object ID=0005).

If a drawn object is determined not to be a temporary drawn object in step S907, the process advances to step S909. In step S909, it is determined whether a drawn object is a handwritten stroke.

If the drawn object is determined as a handwritten stroke, the process advances to step S910. If the drawn object is graphic data or text data other than a handwritten stroke, the process advances to step S912.

In step S910, a character process by a character recognition program is performed. The character process includes a character extraction unit which extracts strokes that form a character or character string from one or more handwritten strokes drawn in the drawing area 301 and puts the extracted strokes into a group, and a character recognition unit which recognizes a character based on the extracted strokes. One or more handwritten strokes which are recognized to form a character by the character process are processed as one character or character string.

A more accurate character process can be done by, after the character process, calculating a character string having the most probable character combination from a plurality of recognition candidate characters using a word dictionary or semantic dictionary and delimiting the character string. Alternatively, semantic analysis may be executed to recognize a word or line as a character string. The handwritten strokes processed in the above way are processed as a group.

In this embodiment, the character process and grouping are done dynamically during execution of the electronic whiteboard application 240 (playback mode). However, the present invention is not limited to this. For example, these processes may be executed in advance to save character string data in recording operation information in the hard disk 206 or activating the electronic whiteboard application 240 (playback mode) during or at the end of a conference.

In step S911, a process of playing back the grouped drawn objects at once is executed to shorten the playback time. Then, playback in a short time is performed in step S905. More specifically, at the same timing as the playback of a drawn object to be played back now, the remaining drawn objects of the group are played back. The playback time control timer is set to the final operation end time in the group. In playing back the drawn objects put into a group, it is therefore possible to shorten the playback time by skipping operation information recorded for each drawn object and advancing the playback time control timer.

If it is determined in step S909 that the drawn object is not a handwritten stroke, the process advances to step S912. In step S912, it is determined whether drawn objects are put into a group. Whether they are grouped is determined based on the group ID in the drawn object table shown in FIG. 5. Group ID assignment can be done either automatically or manually, as described above.

If it is determined in step S912 that the drawn objects are put into a group, the process advances to step S911 to execute the same process as described above.

If it is determined in step S912 that the drawn objects are not put into a group, the process advances to step S906 to execute normal playback based on the operation information.

As is apparent from the above description, in the conference system according to this embodiment, when drawn contents in the drawing area have changed, the change contents are recorded in the operation information table. If the change in the drawn contents is a change of a drawn object in the drawing area, the change contents are recorded in the drawn object table. It is therefore possible, in playing back drawn contents, to determine based on the operation information table and drawn object table whether operation information is necessary for playback and determine the playback timing.

This enables to play back only operation information necessary for playback at an appropriate timing, shorten the playback time, and simply implement playback that facilitates grasp of the contents.

Second Embodiment

In the first embodiment, the personal computer 104 connected to the rear-projection display 101 records the operation information table 251 and drawn object table 252 and plays back drawn contents. However, the present invention is not limited to this. For example, a device which records the operation information table and drawn object table and a device which plays back drawn contents may separately be provided via a network. A display control apparatus according to this embodiment will now be described. Only points different from the first embodiment will be described below.

FIG. 11 is a view showing the overall arrangement of a conference system (display control system) using a display control apparatus according to this embodiment. Referring to FIG. 11, each of conference systems 1101 and 1102 includes a rear-projection display, personal computer, and digitizer pen and has the same arrangement as in FIG. 1.

Reference numeral 1103 denotes a network such as the Internet. A conference server 1104 stores operation information tables and drawn object tables received from the conference systems 1101 and 1102 in the respective locations. A personal computer 1105 functions as a display control apparatus.

Conferences are held in the conference systems 1101 and 1102 in the respective locations. The operation information tables and drawn object tables recorded there are stored in the conference server 1104 via the network interface units of the conference systems and the network 1103.

Devices connectable to the conference server 1104 via the network 1103, that is, the conference systems 1101 and 1102 and the personal computer 1105 can play back drawn contents. These devices have a function of executing the playback mode of the electronic whiteboard application.

In this embodiment, the personal computer 1105 performs operation information acquisition and playback portion extraction in playing back drawn contents. However, the present invention is not limited to this. For example, an external information processing apparatus such as the conference server 1104 may execute some or all of the processes (operation information acquisition and playback portion extraction), and the personal computer may execute only playback display.

As described above, according to this embodiment, in playing back drawn contents using operation information recorded in a conference system including a teleconference, it is possible to shorten the playback time and implement playback that facilitates grasping of the contents. It is also possible to reduce the process load on the playback device by causing a display control apparatus except the playback device to execute some or all of processes except display.

Third Embodiment

In the first and second embodiments, the playback time is shortened by playing back only operation information necessary for playback at appropriate timings. However, the present invention is not limited to this. For example, the playback time may be shortened by playing back, of recorded operation information, only operation information having an attribute designated by the user at appropriate timings. The third embodiment will be described below.

1. Outer Appearance of Display Control System

Figure 12:
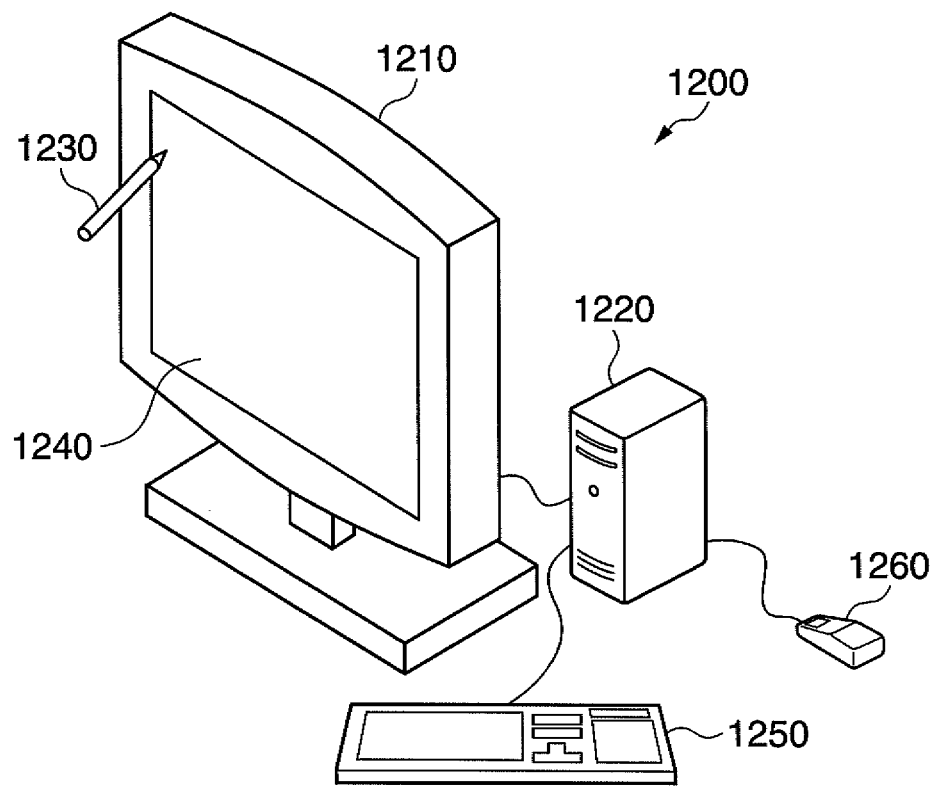
FIG. 12 is a view showing the outer appearance of a conference system (display control system) 1200 having a display control apparatus according to the third embodiment of the present invention.

FIG. 12 is a view showing the outer appearance of a conference system (display control system) 1200 having a display control apparatus according to the third embodiment of the present invention. Referring to FIG. 12, reference numeral 1210 denotes a display apparatus. The display apparatus 1210 is a digitizer-equipped display apparatus having a digitizer 1240 attached around the screen.

A computer apparatus 1220 functions as a display control apparatus for controlling display on the display apparatus 1210 and is communicably connected to the display apparatus 1210. The computer apparatus 1220 has an electronic whiteboard application capable of drawing an object such as a character or graphic pattern and editing a drawn object. The electronic whiteboard application causes the display apparatus 1210 to function as an electronic whiteboard.

A digitizer pen 1230 serves as an input device. The user can draw an object such as a character or graphic pattern and edit a drawn object using the digitizer pen 1230 on the display apparatus 1210 functioning as an electronic whiteboard.

The input devices also include a keyboard 1250 and a mouse 1260, which are connected to the computer apparatus 1220 to input an instruction to it, in addition to the digitizer pen 1230.

2. Arrangement of Display Control Apparatus

Figure 13:
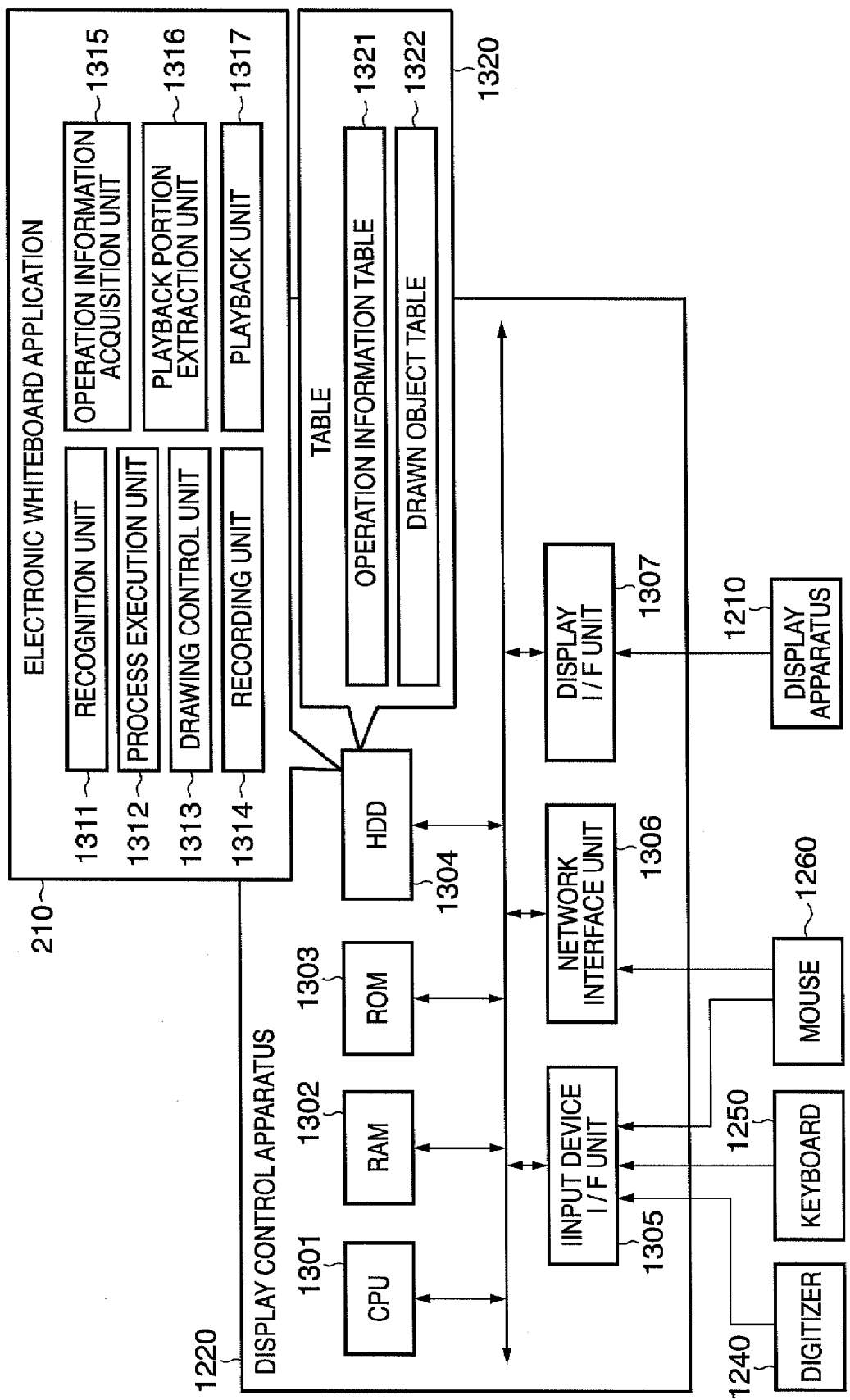
FIG. 13 is a block diagram showing the arrangement of a computer apparatus 1220 which functions as a display control apparatus.

FIG. 13 is a block diagram showing the arrangement of the computer apparatus 1220 which functions as a display control apparatus. The computer apparatus 1220 includes a CPU 1301, RAM 1302, ROM 1303, HDD 1304, input device I/F unit 1305, network interface unit 1306, and display I/F unit 1307.

The input device I/F unit 1305 receives information about an indicated position output from the digitizer 1240. The input device I/F unit 1305 also receives an instruction from the keyboard 1250 or mouse 1260 functioning as an input device for the computer apparatus 1220.

An electronic whiteboard application 1310 stored in the HDD 1304 has functions to be executed in the drawing mode and those to be executed in the playback mode. The drawing mode causes the display apparatus 1210 to function as an electronic whiteboard. The playback mode causes the display apparatus 1210 to function as a playback device.

As the functions to be executed in the drawing mode, the electronic whiteboard application 1310 includes a recognition unit 1311, process execution unit 1312, drawing control unit 1313, and recording unit 1314.

The recognition unit 1311 recognizes various operation instructions received by the input device I/F unit 1305. More specifically, the recognition unit 1311 recognizes a page operation instruction, a drawn object generation instruction, or an instruction for editing an already generated drawn object.

The process execution unit 1312 executes processes corresponding to various operation instructions recognized by the recognition unit 1311.

If a drawn object to be displayed on the display apparatus 1210 is changed by a process executed by the process execution unit 1312, the drawing control unit 1313 generates the changed object. The drawing control unit 1313 then outputs the generated drawn object to the display apparatus 1210 via the display I/F unit 1307.

The recording unit 1314 records, in an operation information table 1321 in the HDD 1304, information (operation information) about various operation instructions recognized by the recognition unit 1311. When a drawn object has changed in accordance with an operation instruction, the recording unit 1314 records information (drawn object information) about the drawn object in a drawn object information table 1322.

As the functions to be executed in the playback mode, the electronic whiteboard application 1310 includes an operation information acquisition unit 1315, playback portion extraction unit 1316, and playback unit 1317.

The operation information acquisition unit 1315 acquires an operation information table and drawn object information table designated by the user from the plurality of operation information tables 1321 and operation information tables 1321 which are recorded in the HDD 1304 in the respective conferences.

The playback portion extraction unit 1316 extracts operation information to be used to play back recorded contents based on the acquired operation information table 1321 and drawn object information table 1322. The operation information to be used to play back recorded contents includes operation information having an attribute designated by the user and pieces of operation information recorded before and after the operation information (this will be described later in detail).

The playback unit 1317 extracts the operation information determined to be used for playback and plays back the recorded contents on the display apparatus 1210 using the operation information.

The electronic whiteboard application 1310, operation information table 1321, and drawn object information table 1322 are loaded in the RAM 1302 as needed under the control of the CPU 1301 and executed by the CPU 1301.

3. Arrangement of Display Window

Figure 14:
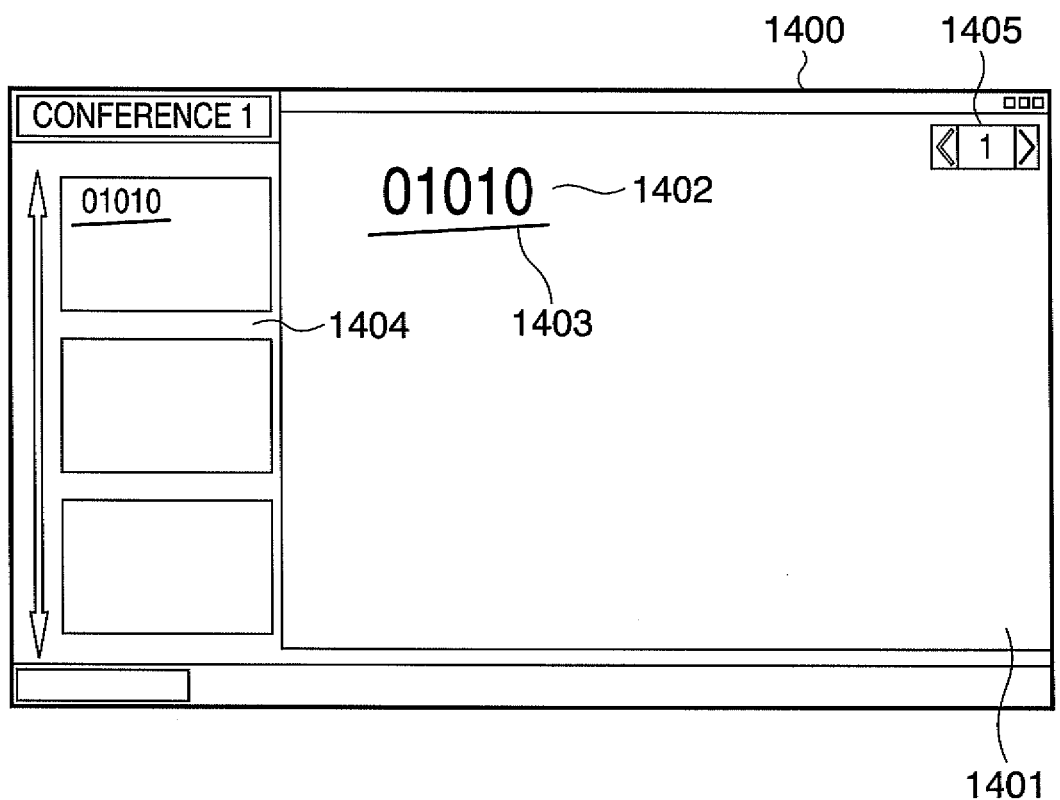
FIG. 14 is a view showing an example of a UI which is displayed on a display apparatus 1210 by activating the drawing mode of an electronic whiteboard application in the conference system 1200.

FIG. 14 is a view showing an example of a UI which is displayed on the display apparatus 1210 by activating the drawing mode of the electronic whiteboard application in the conference system 1200.

Referring to FIG. 14, reference numeral 1400 denotes a display window. An area (drawing area) 1401 allows drawing input in the display window 1400. In the drawing mode, the user can generate a drawn object using the digitizer pen 1230. Reference numerals 1402 and 1403 denote examples of generated drawn objects.

The drawn object 1402 is a character string "01010" which includes five strokes input by handwriting in a handwriting input mode. The drawn object 1403 is a line that is input in a tool input mode and includes one stroke. Switching between the handwriting input mode and the tool input mode is done by a menu (not shown).

The drawn objects 1402 and 1403 drawn in the drawing area 1401 can undergo editing. More specifically, the user selects a drawn object and an item from a menu (not shown), thereby executing editing operations such as movement, resize, erase, cut, and copy.

A page operation area 1404 enables a page operation in the drawing area 1401. The page operation area 1404 displays a thumbnail of a page. The user can perform page operations such as switching, movement, and deletion of a page, and addition of a new page by inputting an instruction using the digitizer pen 1230.

Reference numeral 1405 denotes a page operation button including the number of a page that is being displayed, and page skip and return buttons which are also usable for page switching.

4. Arrangement of Operation Information Table 1321

FIG. 15 is a view showing an example of the operation information table 1321 which records operation information about a user operation performed during execution of the drawing mode of the electronic whiteboard application 1310.

The operation information table 1321 is generated in each conference. Operations such as a drawn object generation operation, editing operation, and page operation are sequentially recorded in the operation information table 1321 as operation information.

Each piece of operation information recorded in the operation information table 1321 has items "operation start time", "operation end time", "operation type", "object ID", "page number", and "user ID".

"Operation start time" indicates the time when an operation has started. "operation end time" indicates the time when an operation has finished. "Operation type" indicates the type of an operation.

"Object ID" indicates the identifier of a drawn object which is generated in the drawing area 1401 and changed (generated or edited) by a user operation and corresponds to the drawn object information table shown in FIG. 16.

"Page number" indicates the number of an operated page or switching destination page. "User ID" indicates the ID of an operator.

5. Arrangement of Drawn Object Information Table 1322

FIG. 16 is a view showing an example of the drawn object information table which records drawn object information about a drawn object that has changed due to a generation or editing operation during execution of the playback mode of the electronic whiteboard application 1310 in the conference system 1200.

A drawn object generated in the drawing area 1401 is automatically assigned an ID. The drawn object information table 1322 records, as drawn object information, "drawn object ID", "data type", and data ("drawn object data") necessary for generating a drawn object.

"Data type" indicates the type of a drawn object, including a stroke or a graphic tool type such as a line, rectangle, or circle. "Drawn object data" records the X and Y coordinates of a handwritten stroke, the coordinates of the start and end points of a line, or the upper left coordinates and lower right coordinates of a rectangle. Color data, line type data, filling color, and the like may also be recorded.

8. Sequence of Playback Process

Figure 17:
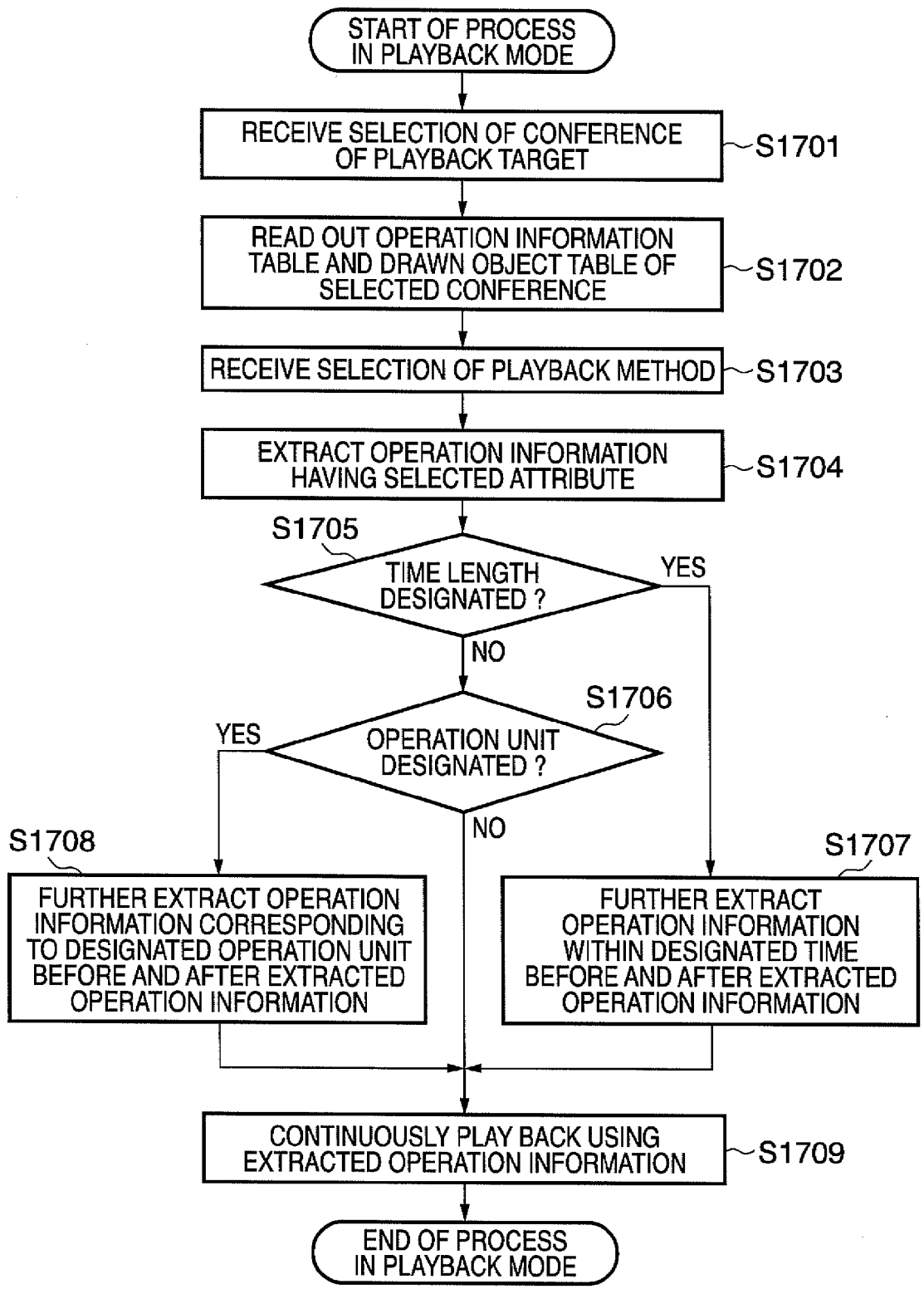
FIG. 17 is a flowchart illustrating the sequence of a recorded contents playback process in the computer apparatus 1220.

FIG. 17 is a flowchart illustrating the sequence of a recorded contents playback process in the computer apparatus 1220. The playback mode of the electronic whiteboard application 1310 is activated. In step S1701, the computer apparatus 1220 receives a conference designation by the user to select recorded contents that have recorded the conference the user wants to play back.

In step S1702, an operation information table and drawn object information table corresponding to the conference designated in step S1701 are read out.

Figure 18:
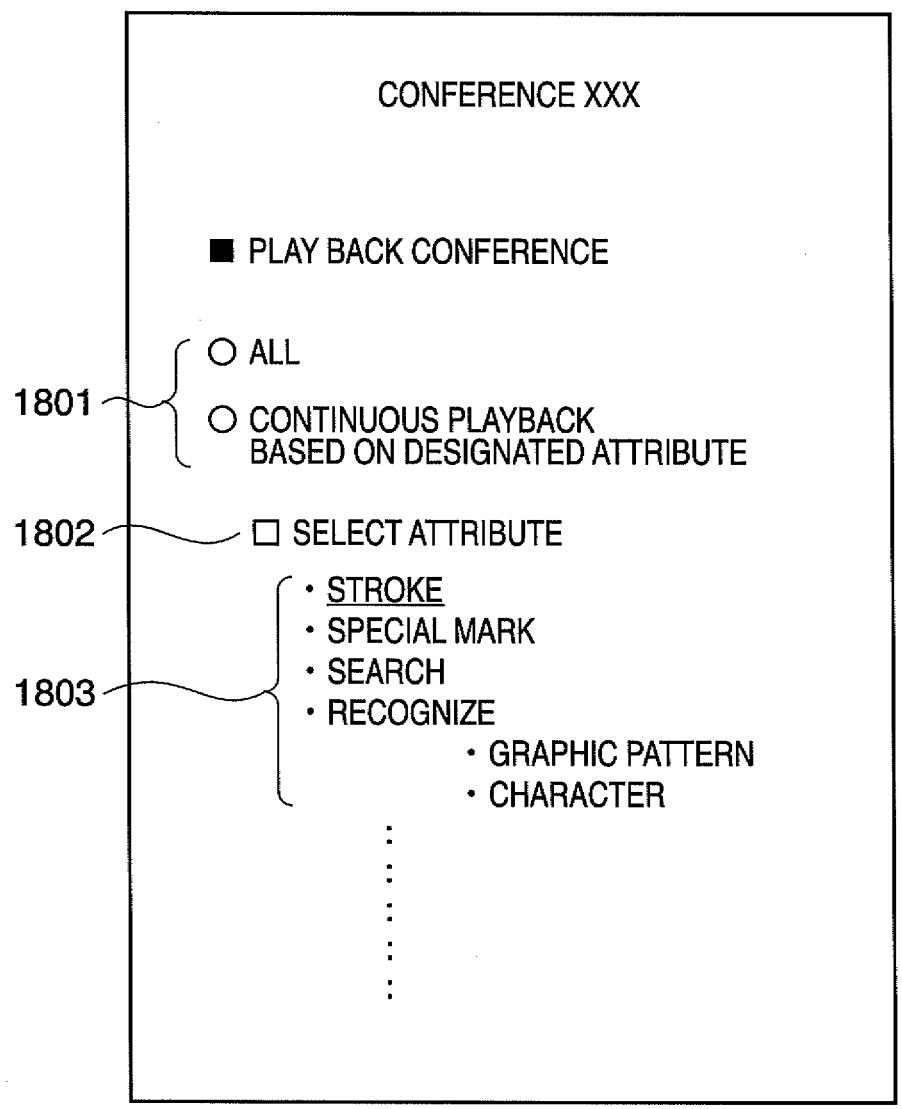
FIG. 18 is a view showing an example of a UI for selecting a playback method.

In step S1703, a UI for selecting a playback method is displayed to receive playback method selection by the user. FIG. 18 is a view showing an example of a UI for selecting a playback method.

As shown in FIG. 18, in this embodiment, the user can select whether to play back recorded contents based on all pieces of recorded operation information or extract operation information having a specific attribute and play back recorded contents on the basis of only the extracted operation information (e.g., 1801).

In extracting operation information having a specific attribute, the user can select the attribute (e.g., 1802). In the example shown in FIG. 18, "stroke", "special mark", "search", "recognize", and the like are displayed as selectable attributes (e.g., 1803).

In step S1704, operation information having the attribute selected in step S1703 is extracted. After the operation information having the specific attribute is extracted in step S1704, a UI for setting a condition (second condition) to select pieces of operation information before and after the extracted operation information is displayed.

FIG. 19 is a view showing an example of a UI for setting a condition to extract pieces of operation information recorded within a predetermined time before and after the operation information extracted in step S1704. In FIG. 19, it is possible to set a time length desired by the user.

FIG. 20 is a view showing an example of a UI for setting a condition to extract pieces of operation information corresponding to a predetermined number of operations before and after the operation information extracted in step S1704. In FIG. 20, it is possible to set the number of operations desired by the user.

As described above, in this embodiment, not only the operation information extracted in step S1704 but also pieces of operation information recorded within a time or a predetermined number of operations before and after the extracted operation information are also extracted. This is because, depending on the selected attribute, the user cannot necessarily grasp the recorded contents that are played back based only on the extracted operation information having the attribute.

For example, an attribute "stroke" indicates a drawn object generation operation performed using the digitizer pen 1230 serving as an input device, or another input device. In this case, the user can grasp the transition of stroke drawing even when only portions input by strokes are extracted and played back.

Similarly, an attribute "edit" indicates that an editing operation such as enlargement, reduction, or movement was executed for a drawn object. In this case, the user can grasp the transition of editing even when only edited portions are extracted and played back.

However, "special mark" is used to indicate, for example, an important portion during a conference, and an extracted special mark adding operation may have been done in a very short time. For this reason, playback based only on the extracted operation information is done instantaneously, and the user cannot grasp the playback result. In this embodiment, considering this problem, pieces of operation information recorded within a predetermined time or a predetermined number of operations before and after operation information extracted in accordance with an attribute are also extracted so that playback can be executed using the extracted operation information.

In step S1705, it is determined whether the time length is designated in the UI shown in FIG. 19. If it is determined in step S1705 that the time length is designated, the process advances to step S1707. In step S1707, pieces of operation information recorded within the designated time are further extracted as operation information before and after the operation information extracted in step S1704.

If it is determined in step S1705 that the time length is not designated, the process advances to step S1706. In step S1706, it is determined whether the number of operations is designated in the UI shown in FIG. 20. If it is determined in step S1706 that the number of operations is designated, the process advances to step S1708.

In step S1708, pieces of operation information corresponding to the designated number of operations are further extracted as operation information before and after the operation information extracted in step S1704.

If it is determined in step S1706 that the number of operations is not designated, the process advances to step S1709.

In step S1709, the recorded contents are played back based on the extracted operation information in the recording order of the operation information. If YES in step S1705, the extracted operation information here includes both the operation information extracted in step S1704 and the operation information extracted in step S1707. If YES in step S1706, the extracted operation information includes both the operation information extracted in step S1704 and the operation information extracted in step S1708. If NO in step S1706, the extracted operation information includes only the operation information extracted in step S1704.

For playback based on the extracted operation information, the state of the whole electronic whiteboard application at the time related to the extracted operation information (or the operation information recorded within the time or predetermined number of operations before and after the extracted operation information) is displayed.

The state of the electronic whiteboard application indicates a state in which drawn objects already generated in a single page upon recording the extracted operation information are displayed.

More specifically, it indicates a state in which recorded contents are simultaneously played back using all pieces of operation information, each of which is recorded after switching to a page including the operation information extracted during execution of the drawing mode of the electronic whiteboard application until the operation start time of the extracted operation information.

Hence, for example, any drawn objects corresponding to operation information recorded before the operation start time are simultaneously played back as recorded contents if they are not erased. The system may be designed to perform playback based on only the extracted operation information and operation information before and after it. However, normally, the user can easily grasp the playback result by viewing the entire electronic whiteboard. For this reason, playback is done in the above-described manner.

Figure 21:
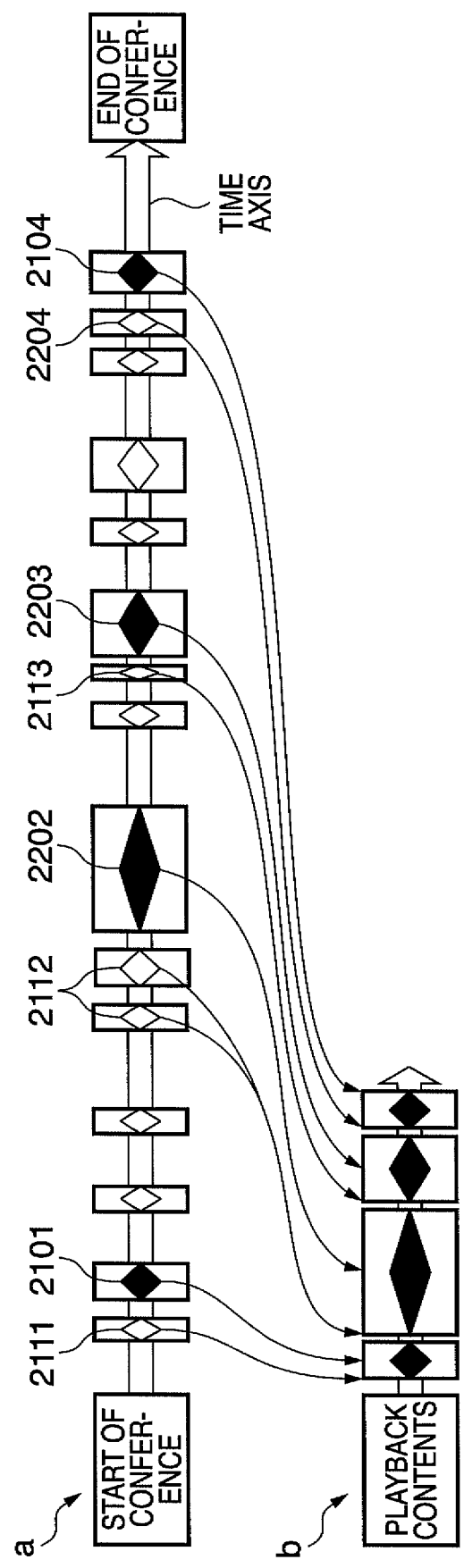
FIG. 21 is a conceptual view showing, along a time axis, continuous playback using extracted operation information.
Figure 22:
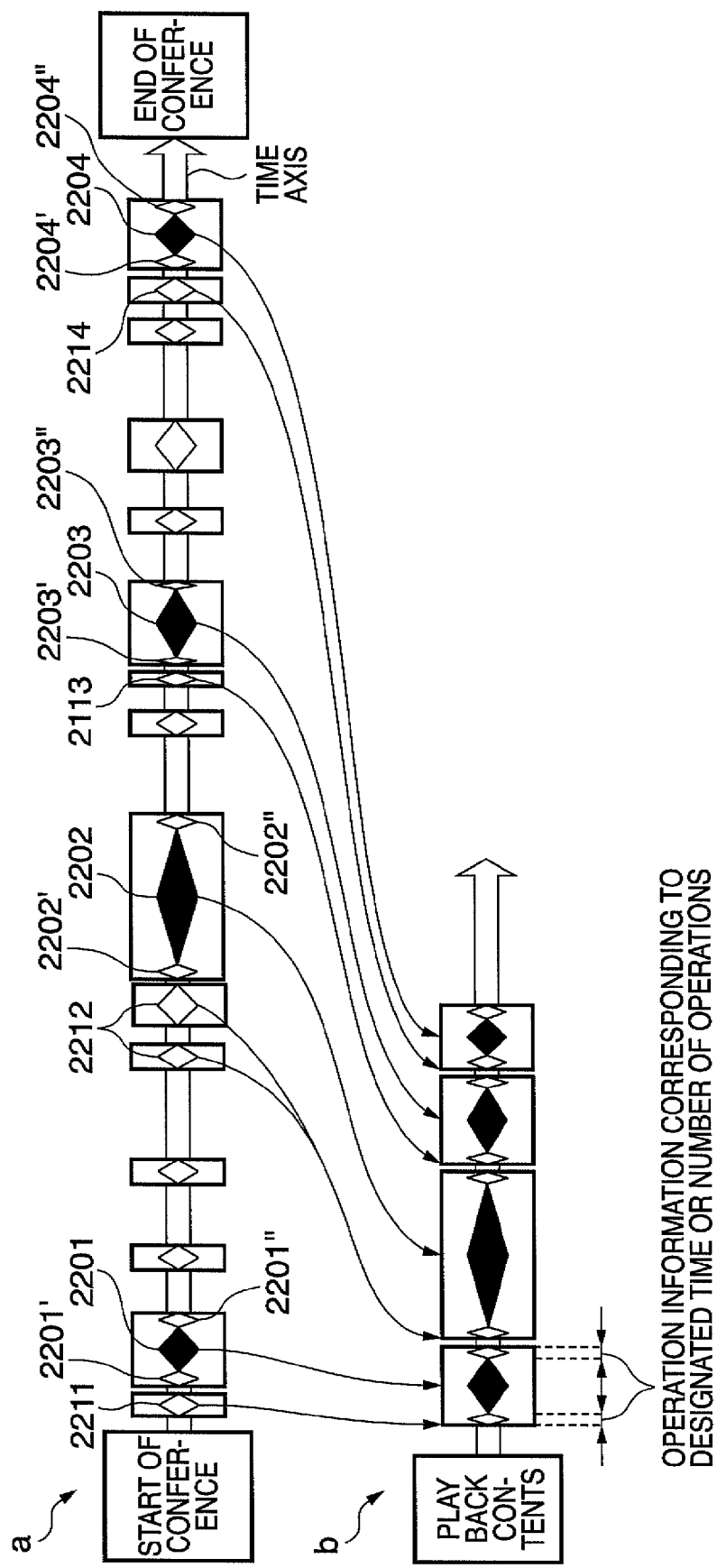
FIG. 22 is a conceptual view showing, along a time axis, continuous playback using extracted operation information.

FIGS. 21 and 22 are conceptual views showing, along a time axis, continuous playback using extracted operation information. FIG. 21 shows continuous playback without a designation of the time length or the number of operations. FIG. 22 shows continuous playback with a designation of the time length or the number of operations.

Referring to FIG. 21, a visually illustrates operations executed by the user from the start to the end of a conference along the time axis. Each of the rectangles arranged along the time axis of a in FIG. 21 represents a continuous user operation. The left side of each rectangle represents the operation start time of the continuous operation, and the right side represents the operation end time. Of rhombuses in the rectangles, a filled rhombus represents operation information corresponding to drawn object information having the attribute selected in step S1703. An open rhombus represents operation information corresponding to drawn object information without the attribute selected in step S1703.

That is, pieces of operation information 2101 to 2104 are operation information to be extracted. Each of pieces of operation information 2111 to 2114 is recorded after switching to a page including operation information to be extracted until the operation start time of the operation information to be extracted. The pieces of operation information 2111 to 2114 are used to display the state of the whole electronic whiteboard application in playing back the recorded contents using the pieces of operation information 2101 to 2104.

Referring to FIG. 21, b illustrates continuous playback of the recorded contents using the extracted operation information. As indicated by b in FIG. 21, first, to display the state of the whole electronic whiteboard application, the recorded contents are simultaneously played back based on the operation information 2111, and then, the recorded contents are played back based on the operation information 2101. Next, to display the state of the whole electronic whiteboard application, the recorded contents are simultaneously played back based on the operation information 2112, and then, the recorded contents are played back based on the operation information 2102. When the recorded contents are played back based on the operation information 2104 in the same way, the playback process is ended.

In this way, the recorded contents are continuously played back in chronological order based on the operation information extracted by selecting an attribute. This enables to review the recorded contents in a time much shorter than the total time. Playback of the recorded contents is implemented by referring to the items of operation information and executing extraction, concatenation, and playback processes.

On the other hand, when the user designates the time length or the number of operations, the recorded contents are continuously played back, including operation information before and after each extracted operation information, as shown in FIG. 22.

For example, if "3 sec" is set in step 31705, pieces of operation information within 3 sec before the operation start time and after the operation end time of each of pieces of operation information 2201 to 2204 extracted in step S1704 are also extracted. More specifically, pieces of operation information 2201', 2201", 2202', 2202", 2203', 2203", 2204', and 2204" are extracted.

To display the state of the whole electronic whiteboard application at the operation start time of each of the pieces of extracted operation information 2201' to 2204', simultaneous playback based on pieces of pieces of operation information 2211 to 2214 is executed.

If "5 operations" is set in step S1706, the pieces of operation information 2201' to 2204" corresponding to five operations before and after each of the pieces of pieces of operation information 2201 to 2204 extracted in step S1704 are extracted.

To display the state of the whole electronic whiteboard application at the operation start time of each of the pieces of extracted operation information 2201' to 2204', simultaneous playback based on the pieces of pieces of operation information 2211 to 2214 is executed.

As is apparent from the above description, in this embodiment, the user designates an attribute in playing back recorded contents based on operation information recorded during execution of the drawing mode of the electronic whiteboard application. Pieces of operation information having the designated attribute are extracted so that the recorded contents based on the extracted operation information are continuously played back. This allows the user to play back his/her desired recorded contents and easily grasp the contents.

In this embodiment, in selectively continuously playing back recorded contents desired by the user, pieces of operation information before and after appropriate operation information are also extracted, and the recorded contents are played back using the operation information. This enables the user to easily grasp the playback result.

In this embodiment, recorded contents are played back based on extracted operation information while simultaneously playing back drawn objects which are already generated in a single page upon recording the extracted operation information. This allows the user to view the state of the whole electronic whiteboard application and easily grasp the playback result.

In continuous playback of this embodiment, it is preferable to display data indicating switching of extracted operation information in playing back a concatenated portion. In, for example, FIG. 21, playback based on the pieces of operation information 2101 to 2104 is continuously executed. To facilitate understanding, playback may be done while, for example, inserting a telop indicating a scene change to each concatenated portion or using an image effect such as fade-in and fade-out.

The selectable attributes are not limited to those shown in FIG. 18. For example, they may include a "character recognition attribute" that is the attribute of an operation of recognizing characters formed by objects drawn on the electronic whiteboard and converting them into text information, and a "graphic recognition attribute" that is the attribute of an operation of recognizing graphic patterns.

Other examples of the attributes are a "material search attribute" that is the attribute of an operation of searching for, for example, a material file, and a "position search attribute" that is the attribute of an operation of searching for an operation at a specific position. Other examples of the attributes are a "copy (cut) & paste attribute" that is the attribute of a copy (or cut) & paste operation, and a "page switching attribute" that is the attribute of a page switching operation.

As described above, it is possible to define attributes in accordance with the types of operations executable on the electronic whiteboard. It is also possible to subdivide the attributes. For, for example, a "stroke attribute", a color type and a pentip thickness may be defined. For a "text input attribute", an attribute such as a font type may be defined. However, the attributes are preferably effective for achieving the object of the present invention because attributes corresponding to operations that rarely take place during a conference or attributes which are not important in reviewing a conference have little effect.

Fourth Embodiment

In the above-described third embodiment, the user designates an attribute in extracting his/her desired operation information. However, the present invention is not limited to this, and the user may designate a drawn object.

In this embodiment, playback is performed by extracting operation information based on a specific drawn object for operation information and drawn object information recorded using an electronic whiteboard application. The outer appearance of a conference system and the arrangement of a computer apparatus are the same as in the third embodiment, and a description thereof will not be repeated.

Figure 23:
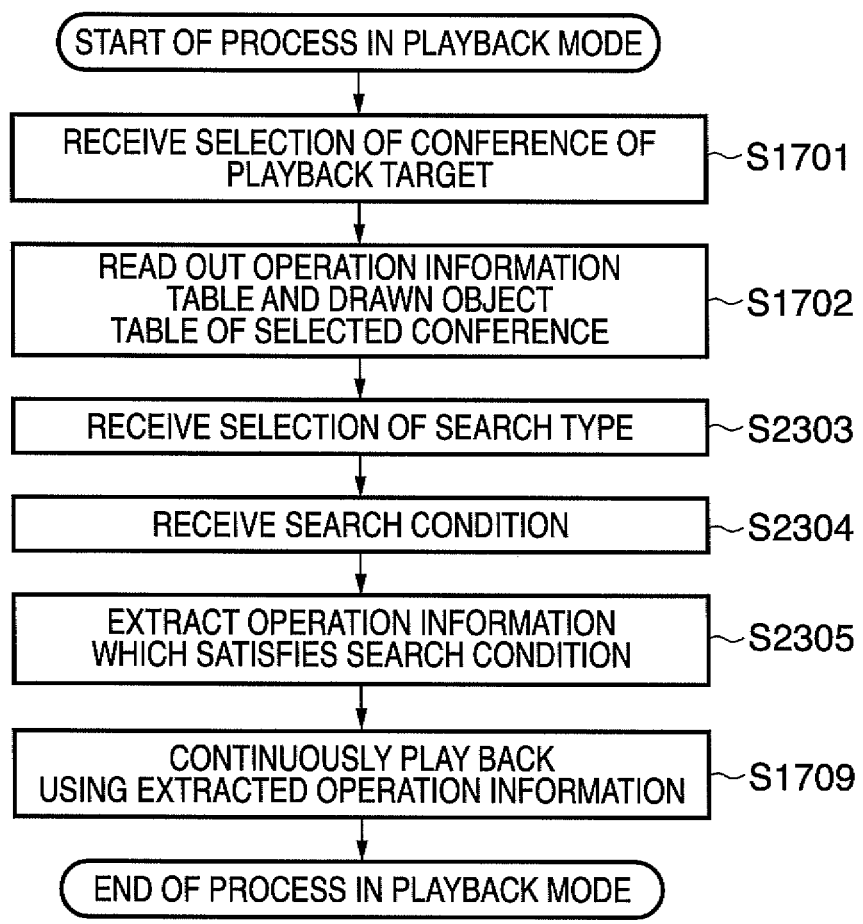
FIG. 23 is a flowchart illustrating the sequence of a playback process in a computer apparatus according to the fourth embodiment of the present invention.

FIG. 23 is a flowchart illustrating the sequence of a playback process in the computer apparatus according to this embodiment.

The playback mode of an electronic whiteboard application 1310 is activated. In step S1701, the computer apparatus receives a conference designation by the user to select recorded contents that have recorded the conference the user wants to play back. In step S1702, an operation information table and drawn object information table corresponding to the conference designated in step S1701 are read out.

Figure 24:
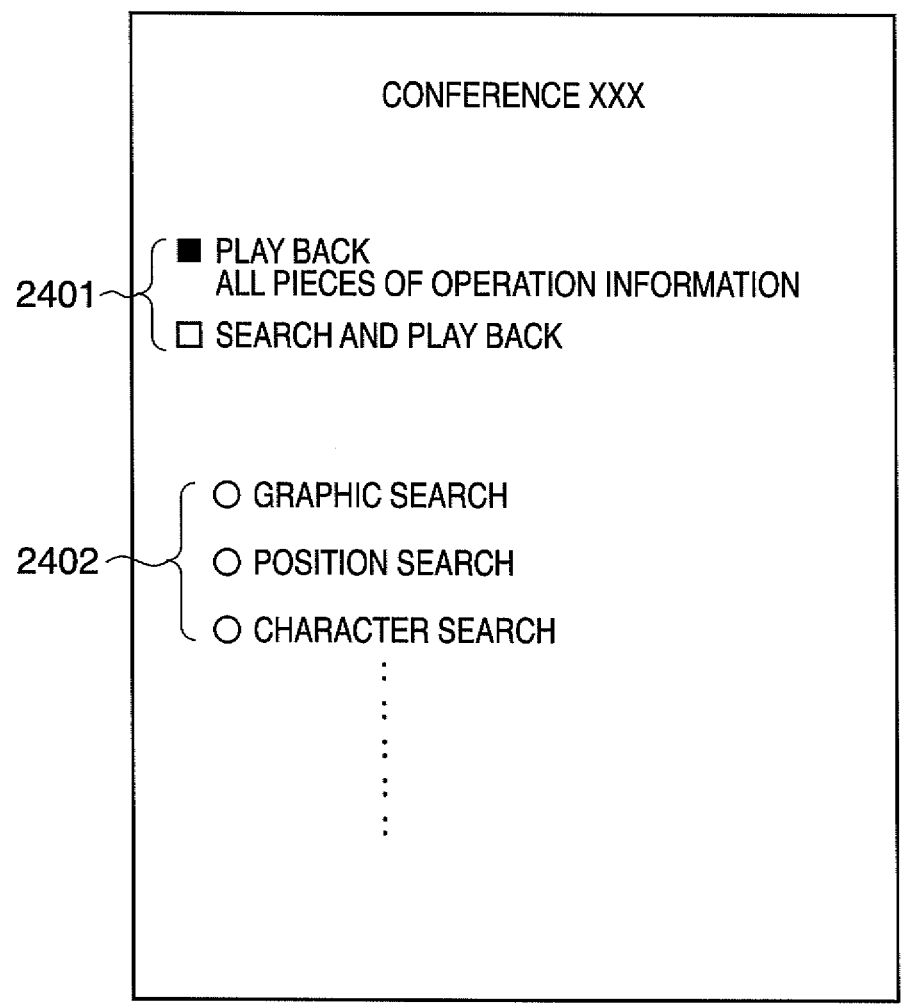
FIG. 24 is a view showing an example of a UI for selecting a search type.

In step S2303, a UI for selecting search type is displayed to receive search type selection by the user. FIG. 24 is a view showing an example of a UI for selecting a search type.

As shown in FIG. 24, in this embodiment, the user can select to playback recorded contents based on all pieces of recorded operation information (e.g., 2401). The user can also select to extract operation information recorded upon generating or editing a drawn object corresponding to a specific graphic pattern, character, or drawing position and play back recorded contents based on only the extracted operation information (e.g., 2402).

In step S2304, a screen (see one of FIGS. 25 to 27) for inputting a search condition (first condition) corresponding to the search type selected in step S2302 is displayed to receive search condition input.

Search types and search conditions will be described here.

Figure 25:
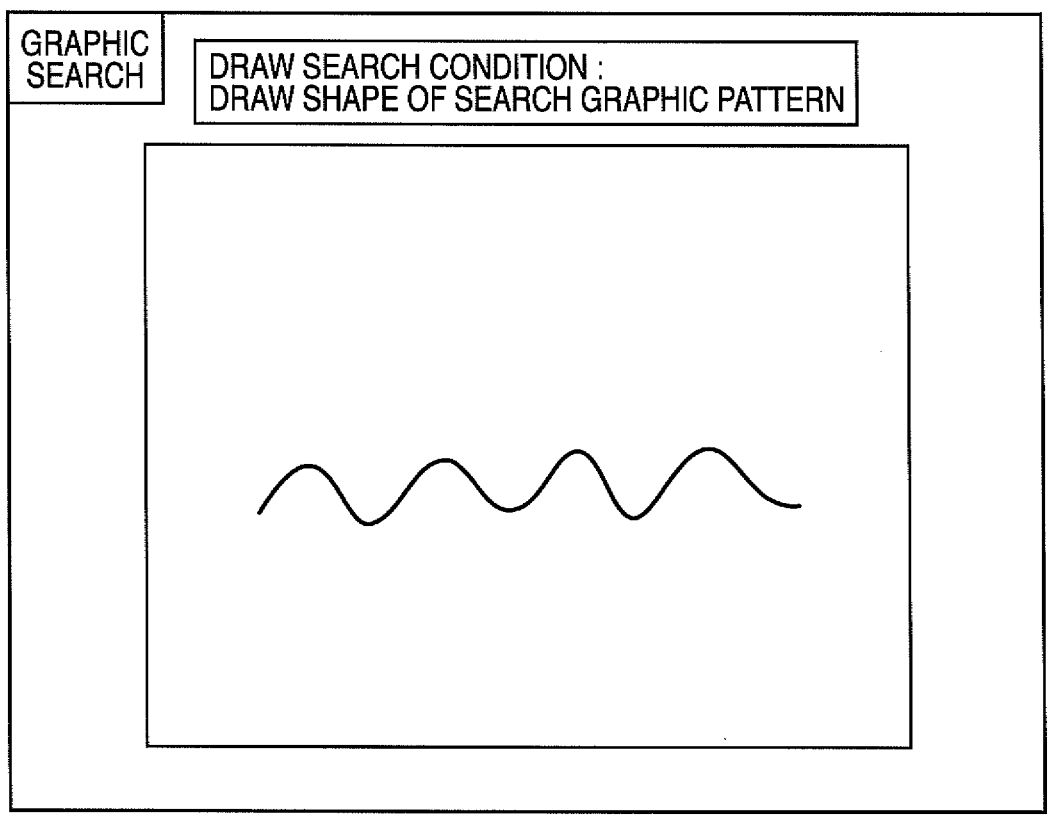
FIG. 25 is a view showing an example of a screen for inputting a search condition corresponding to a selected search type.

Graphic search is used to search for an arbitrary graphic pattern. For example, an enclosure mark or underline is used for pointing at a high probability. By designating such a graphic pattern as a search target, a portion where the designated drawn object was generated during a conference can be searched for and extracted. For example, an input screen as shown in FIG. 25 is displayed as the search condition input screen so that the user can input a search target graphic pattern in this input screen. In the graphic search, the drawn object information table is searched using, as a key, the graphic pattern input by the user in FIG. 25, thereby extracting operation information recorded upon generating a similar drawn object during the conference.

Figure 26:
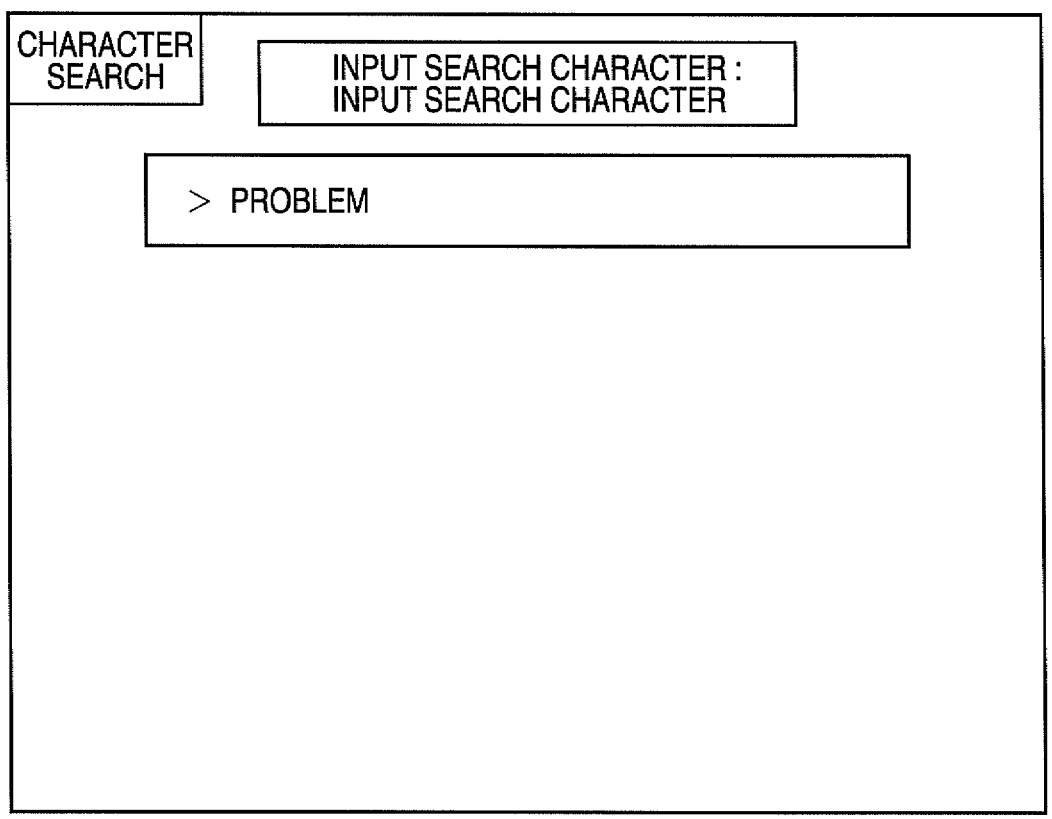
FIG. 26 is a view showing an example of a screen for inputting a search condition corresponding to a selected search type.

Character search is used to search for an arbitrary character. It is possible to search for and extract operation information recorded upon drawing the designated search target character during a conference. For example, an input screen as shown in FIG. 26 is displayed as the search condition input screen so that the user can input a search target character in this input screen. In the character search, the drawn object information table is searched using, as a key, the character input by the user in FIG. 26, thereby extracting operation information recorded upon drawing a similar character during the conference. In searching the drawn object information table, a character recognition process is executed simultaneously. Characters input by handwriting (strokes) are recognized as text information.

Position search is used to search for a drawn object at an arbitrary position. It is possible to search for and extract the operation information of a generation operation or editing operation recorded upon generating or editing a drawn object at an arbitrary position on the electronic whiteboard. For example, an input screen as shown in FIG. 27 is displayed as the search condition input screen so that the user can input a search target position in this input screen. In the position search, position information input in FIG. 27 serves as a key. As a result, the drawn object information table is searched, thereby extracting operation information recorded upon generating or editing a drawn object at the position during the conference.

Referring back to FIG. 23, in step S1709, continuous playback is executed based on the operation information extracted in step S2305 in the recording order of the operation information.

For playback based on the extracted operation information, the state of the whole electronic whiteboard application at the time related to the extracted operation information is displayed.

However, recorded contents may be played back based only on operation information extracted by search without displaying the state of the whole electronic whiteboard. Particularly in the position search, playing back recorded contents based on only extracted operation information is more effective because only recorded contents based on operation information recorded upon generating or editing a drawn object at a specific position can be played back.

The position search may be combined with another search or the playback method described in the third embodiment. For example, search and playback may be done based on a designated range and a designated graphic pattern. Alternatively, playback may be performed based on a designated range and a designated operation attribute.

As is apparent from the above description, according to this embodiment, the user can designate a search condition based on a drawn object in playing back recorded contents based on operation information recorded by the electronic whiteboard application.

Fifth Embodiment

In the third and fourth embodiments, the electronic whiteboard application records drawn object information in correspondence with the operation information table. However, the present invention is not limited to this. Voice data and its attribute information (e.g., information about the speaker) may be recorded together.

In this case, when execution of the electronic whiteboard application starts, voice data and its attribute information are sequentially recorded in correspondence with time information. As a result, in playing back recorded contents based on extracted operation information, the voice data recorded between the operation start time and operation end time of the operation information is played back together.

This makes it possible to play back even voice data in a much shorter playback time. In extracting operation information, the attribute information of voice data may be selected.

Other Embodiments

The present invention is also applicable to a system including a plurality of devices (e.g., host computer, interface device, reader, and printer) or an apparatus (e.g., copying machine or facsimile apparatus) including a single device.

The object of the present invention is achieved even by supplying a storage medium which records software program codes for implementing the functions of the above-described embodiments to the system or apparatus. In this case, the functions are implemented by causing the computer (or CPU or MPU) of the system or apparatus to read out and execute the program codes stored in the storage medium. In this case, the storage medium which stores the program codes constitutes the present invention.

Examples of the storage medium to supply the program codes are a Floppy® disk, hard disk, optical disk, magnetooptical disk, CD-ROM, CD-R, magnetic tape, nonvolatile memory card, and ROM.

The functions of the above-described embodiments are implemented not only when the computer executes the readout program codes but also when, e.g., the OS (operating system) running on the computer partially or wholly executes actual processing based on the instructions of the program codes.

The functions of the above-described embodiments are also implemented when the program codes read out from the storage medium are written in the memory of a function expansion board inserted into the computer or a function expansion unit connected to the computer. More specifically, after the program codes are written in the memory, the CPU of the function expansion board or function expansion unit partially or wholly executes actual processing based on the instructions of the program codes, thereby implementing the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115990 filed on Apr. 25, 2007, and No. 2007-125026 filed on May 9, 2007, which are hereby incorporated by reference herein in their entirety.

What is claimed is:

1. A display control method in a display control apparatus connected to a display apparatus, comprising the steps of:
    acquiring, from a recording apparatus which records drawn contents in a drawing area upon receiving operation information representing an operation in the drawing area, pieces of the operation information and the drawn contents;
    first determining whether or not the pieces of operation information acquired in the acquiring step are of operation information representing a continuous page operation to search for a target page by continuously switching pages, based on a page display time of an intermediate part except first and final pages included in the operation information or based on whether or not an operation other than page operations is included between the page operations in the operation information;
    secondly determining, if in the first determining step the pieces of the operation information are determined to be of operation information representing continuous page operations, whether operation information about operations other than first and final operations included in the continuous page operations is unnecessary for playback; and
    extracting operation information other than the operation information determined to be unnecessary for playback in the second determining step and playing back the drawn contents on the display apparatus using the extracted operation information.

2. The method according to claim 1, wherein the acquiring step acquires an operation information table which sequentially records pieces of user operation information that have changed the drawn contents in the drawing area and a drawn object table which sequentially records pieces of information about objects in the drawing area which have been changed by the operations.

3. A display control apparatus connected to a display apparatus, comprising:
    an acquisition unit configured to acquire, from a recording apparatus which records drawn contents in a drawing area upon receiving operation information representing an operation in the drawing area, pieces of the operation information and the drawn contents;
    a first determination unit configured to determine whether or not the pieces of operation information acquired by said acquisition unit is operation information representing a continuous page operation to search for a target page by continuously switching pages, based on a page display time of an intermediate part except first and final pages included in the operation information or based on whether or not an operation other than page operations is included between the page operations in the operation information;
    a second determination unit configured to determine, if the pieces of the operation information are determined by the first determination unit to be operation information representing continuous page operations, whether operation information about operations other than first and final operations included in the continuous page operations is unnecessary for playback; and
    a playback unit configured to extract the operation information other than the operation information determined to be unnecessary for playback by said second determination unit and playback the drawn contents on the display apparatus using the extracted operation information.

4. A program stored in a non-transitory computer-readable storage medium which, when executed by a processor, will cause a computer to execute the display control method of claim 1.

* * * * *